United States Patent
Chen et al.

(10) Patent No.: US 11,537,803 B2
(45) Date of Patent: Dec. 27, 2022

(54) POINT OF SALE SYSTEM

(71) Applicant: Square, Inc., San Francisco, CA (US)

(72) Inventors: Yenliang Chen, San Francisco, CA (US); Isreal Blagdan, Oakland, CA (US); Michael C. Lamfalusi, Cupertino, CA (US); Kartik Lamba, Berkeley, CA (US); Jeremy Wade, San Francisco, CA (US)

(73) Assignee: Block, Inc., San Francisco, CA (US)

( * ) Notice: Subject to any disclaimer, the term of this patent is extended or adjusted under 35 U.S.C. 154(b) by 370 days.

(21) Appl. No.: 16/051,381

(22) Filed: Jul. 31, 2018

(65) Prior Publication Data
US 2021/0240946 A1  Aug. 5, 2021

Related U.S. Application Data

(63) Continuation of application No. 15/003,580, filed on Jan. 21, 2016, which is a continuation of application No. 14/592,102, filed on Jan. 8, 2015.
(Continued)

(51) Int. Cl.
*G06K 7/08* (2006.01)
*G06K 19/077* (2006.01)
(Continued)

(52) U.S. Cl.
CPC .......... *G06K 7/084* (2013.01); *G06F 3/0481* (2013.01); *G06F 3/0484* (2013.01);
(Continued)

(58) Field of Classification Search
CPC .... G06Q 20/204; G06Q 20/20; G06Q 20/322; G06Q 20/3278; G06Q 20/40; G06K 7/084; G06K 19/07703; G07G 1/0018
(Continued)

(56) References Cited

U.S. PATENT DOCUMENTS 3,128,349 A  4/1964  Boesch et al.
4,304,385 A  12/1981  Farouche et al.
(Continued)

FOREIGN PATENT DOCUMENTS

AU  2324402 A  6/2002
AU  2015349752 B2  7/2017
(Continued)

OTHER PUBLICATIONS

Dwoskin, Jeffrey Scott. Securing the use of sensitive data on remote devices using a hardware-software architecture. Princeton University. ProQuest Dissertations Publishing, 2010. (Year: 2010).*
(Continued)

*Primary Examiner* — Victoria E. Frunzi
*Assistant Examiner* — Fawaad Haider
(74) *Attorney, Agent, or Firm* — Maynard Cooper & Gale, P.C.; Brian T. Sattizahn, Esq.

(57) ABSTRACT

A point-of-sale system is a dual-screen stand assembly that includes a merchant terminal and a consumer terminal. The merchant terminal and the consumer terminal can be mated together in a fixed position to form a single unitary stand, or can be separated from each other in a separated position with each terminal serving as its own separate stand. The merchant terminal supports a merchant computing device and is oriented in a merchant-facing direction. The consumer terminal is detachably mated to the merchant terminal and supports a consumer computing device that is oriented in a consumer-facing direction. The point-of-sale system also includes a card reader as part of the customer terminal to perform a payment. The card reader is configured to accepting swipe cards, chip cards or contactless (EMV or NFC) payments.

25 Claims, 17 Drawing Sheets

Related U.S. Application Data

(60) Provisional application No. 62/053,029, filed on Sep. 19, 2014.

(51) Int. Cl.
| | | |
|---|---|---|
| *G06F 3/0481* | (2022.01) | |
| *G06F 3/0484* | (2022.01) | |
| *G06F 3/04883* | (2022.01) | |
| *G06Q 20/20* | (2012.01) | |
| *G06Q 20/34* | (2012.01) | |

(52) U.S. Cl.
CPC ... *G06F 3/04883* (2013.01); *G06K 19/07703* (2013.01); *G06Q 20/20* (2013.01); *G06Q 20/202* (2013.01); *G06Q 20/204* (2013.01); *G06Q 20/341* (2013.01)

(58) Field of Classification Search
USPC .......................................................... 705/17
See application file for complete search history.

(56) References Cited

U.S. PATENT DOCUMENTS

| | | | |
|---|---|---|---|
| 4,776,003 A | 10/1988 | Harris | |
| 4,860,336 A | 8/1989 | D'Avello et al. | |
| 5,221,838 A | 6/1993 | Gutman et al. | |
| 5,331,138 A | 7/1994 | Saroya | |
| 5,351,296 A | 9/1994 | Sullivan | |
| 5,388,155 A | 2/1995 | Smith | |
| 5,408,513 A | 4/1995 | Busch, Jr. et al. | |
| 5,494,136 A | 2/1996 | Humble | |
| 5,714,741 A | 2/1998 | Pieterse et al. | |
| 5,729,591 A | 3/1998 | Bailey | |
| 5,740,232 A | 4/1998 | Pailles et al. | |
| 5,838,773 A | 11/1998 | Eisner et al. | |
| 5,850,599 A | 12/1998 | Seiderman | |
| 5,867,795 A | 2/1999 | Novis et al. | |
| 5,940,510 A | 8/1999 | Curry et al. | |
| 5,963,647 A | 10/1999 | Downing et al. | |
| 5,970,146 A | 10/1999 | McCall et al. | |
| 6,010,067 A | 1/2000 | Elbaum | |
| 6,062,477 A | 5/2000 | Wike, Jr. et al. | |
| 6,098,881 A | 8/2000 | Deland, Jr. et al. | |
| 6,098,888 A | 8/2000 | Praden | |
| 6,144,336 A | 11/2000 | Preston et al. | |
| 6,157,966 A | 12/2000 | Montgomery et al. | |
| 6,234,389 B1 | 5/2001 | Valliani et al. | |
| 6,278,779 B1 | 8/2001 | Bryant et al. | |
| 6,321,339 B1 | 11/2001 | French et al. | |
| 6,481,623 B1 | 11/2002 | Grant et al. | |
| 6,766,994 B2 | 7/2004 | Serbinski et al. | |
| 6,990,683 B2 | 1/2006 | Itabashi | |
| 7,003,316 B1 | 2/2006 | Elias et al. | |
| 7,004,385 B1 | 2/2006 | Douglass | |
| 7,048,184 B2 | 5/2006 | Persky | |
| 7,066,382 B2 | 6/2006 | Kaplan | |
| 7,083,090 B2 | 8/2006 | Zuili | |
| 7,163,148 B2 | 1/2007 | Durbin et al. | |
| 7,210,627 B2 | 5/2007 | Morley et al. | |
| 7,363,054 B2 | 4/2008 | Elias et al. | |
| 7,424,732 B2 | 9/2008 | Matsumoto et al. | |
| 7,433,452 B2 | 10/2008 | Taylor et al. | |
| 7,591,425 B1 | 9/2009 | Zuili et al. | |
| 7,597,250 B2 | 10/2009 | Finn | |
| 7,673,799 B2 | 3/2010 | Hart et al. | |
| 7,810,729 B2 | 10/2010 | Morley, Jr. | |
| 7,866,546 B1 | 1/2011 | Vance | |
| 7,896,248 B2 | 3/2011 | Morley, Jr. | |
| 8,086,531 B2 | 12/2011 | Litster et al. | |
| 8,117,125 B1* | 2/2012 | Kawan ................. | G06Q 20/10 705/40 |
| 8,126,734 B2 | 2/2012 | Dicks et al. | |
| 8,261,064 B2 | 9/2012 | Ditzman et al. | |
| 8,265,553 B2 | 9/2012 | Cheon et al. | |
| 8,397,988 B1 | 3/2013 | Zuili | |
| 8,558,685 B2 | 10/2013 | Long et al. | |
| 8,768,838 B1 | 7/2014 | Hoffman | |
| 8,788,428 B2 | 7/2014 | Weston et al. | |
| 8,944,322 B2 | 2/2015 | White | |
| 8,988,354 B2 | 3/2015 | Milhe et al. | |
| 9,020,853 B2 | 4/2015 | Hoffman et al. | |
| 9,047,639 B1 | 6/2015 | Quintiliani et al. | |
| 9,092,766 B1* | 7/2015 | Bedier ................. | G06Q 20/204 |
| 9,129,274 B1 | 9/2015 | Mocko et al. | |
| 9,257,018 B2 | 2/2016 | Edwards et al. | |
| 9,286,494 B1 | 3/2016 | Lamfalusi et al. | |
| 9,367,842 B2 | 6/2016 | Quigley et al. | |
| 9,589,428 B2 | 3/2017 | Edwards et al. | |
| 9,679,286 B2 | 6/2017 | Colnot et al. | |
| 9,721,247 B2* | 8/2017 | Bedier ................. | G06Q 20/20 |
| 9,741,211 B2 | 8/2017 | Skiles | |
| 9,792,783 B1 | 10/2017 | Beatty et al. | |
| 9,881,288 B1 | 1/2018 | Bell et al. | |
| 9,911,266 B2 | 3/2018 | Weston et al. | |
| 9,916,570 B2 | 3/2018 | Edwards et al. | |
| 9,946,506 B2 | 4/2018 | Ting et al. | |
| 9,965,116 B1 | 5/2018 | Wolter | |
| 10,019,605 B2 | 7/2018 | Boysen et al. | |
| 10,121,136 B2 | 11/2018 | Mocko et al. | |
| 10,140,604 B1 | 11/2018 | Douthat et al. | |
| 10,318,953 B2 | 6/2019 | Binder et al. | |
| 10,475,024 B1 | 11/2019 | Behren et al. | |
| 10,504,096 B1 | 12/2019 | Hafemann et al. | |
| 10,579,989 B1 | 3/2020 | Binder et al. | |
| 10,762,196 B2 | 6/2020 | Cat | |
| 10,713,904 B2 | 7/2020 | Beatty et al. | |
| 10,733,588 B1 | 8/2020 | Mocko et al. | |
| 10,783,509 B2 | 9/2020 | Pattarawuttiwong | |
| 11,080,674 B1 | 8/2021 | Chen et al. | |
| 2002/0082993 A1 | 6/2002 | Hoyos et al. | |
| 2002/0091633 A1 | 7/2002 | Proctor | |
| 2002/0153414 A1 | 10/2002 | Stoutenburg et al. | |
| 2002/0166891 A1 | 11/2002 | Stoutenburg et al. | |
| 2003/0004876 A1 | 1/2003 | Jacobson | |
| 2003/0066893 A1 | 4/2003 | Yap et al. | |
| 2003/0135406 A1 | 7/2003 | Rowe | |
| 2003/0135418 A1 | 7/2003 | Shekhar et al. | |
| 2003/0135751 A1 | 7/2003 | O'Donnell et al. | |
| 2003/0154414 A1 | 8/2003 | von Mueller et al. | |
| 2003/0183691 A1 | 10/2003 | Lahteenmaki et al. | |
| 2003/0191713 A1 | 10/2003 | Yap et al. | |
| 2004/0012875 A1 | 1/2004 | Wood | |
| 2004/0041911 A1 | 3/2004 | Odagiri et al. | |
| 2004/0043650 A1 | 3/2004 | Yang et al. | |
| 2004/0059682 A1 | 3/2004 | Hasumi et al. | |
| 2004/0167820 A1 | 8/2004 | Melick et al. | |
| 2004/0204082 A1 | 10/2004 | Abeyta | |
| 2005/0039052 A1 | 2/2005 | O'Donnell et al. | |
| 2005/0097015 A1 | 5/2005 | Wilkes et al. | |
| 2005/0109841 A1 | 5/2005 | Ryan et al. | |
| 2005/0116840 A1 | 6/2005 | Simelius | |
| 2005/0236480 A1 | 10/2005 | Vrotsos et al. | |
| 2005/0283403 A1 | 12/2005 | Ramirez et al. | |
| 2006/0032905 A1 | 2/2006 | Bear et al. | |
| 2006/0049255 A1 | 3/2006 | von Mueller et al. | |
| 2006/0168663 A1 | 7/2006 | Vijloen et al. | |
| 2006/0223580 A1 | 10/2006 | Antonio et al. | |
| 2006/0226224 A1 | 10/2006 | Henry | |
| 2006/0242696 A1 | 10/2006 | Cruzado et al. | |
| 2007/0067833 A1 | 3/2007 | Colnot | |
| 2007/0136216 A1 | 6/2007 | Simcik et al. | |
| 2007/0168300 A1 | 7/2007 | Quesselaire et al. | |
| 2007/0194104 A1 | 8/2007 | Fukuda et al. | |
| 2007/0198436 A1 | 8/2007 | Weiss | |
| 2007/0251997 A1 | 11/2007 | Brown et al. | |
| 2007/0257110 A1 | 11/2007 | Schmidt et al. | |
| 2008/0091617 A1 | 4/2008 | Hazel et al. | |
| 2008/0209212 A1 | 8/2008 | Ditzman et al. | |
| 2008/0215887 A1 | 9/2008 | Hart et al. | |
| 2009/0006262 A1 | 1/2009 | Brown et al. | |
| 2009/0070583 A1 | 3/2009 | von Mueller et al. | |
| 2009/0102813 A1 | 4/2009 | Mamba et al. | |
| 2009/0112768 A1 | 4/2009 | Hammad et al. | |

(56) References Cited

U.S. PATENT DOCUMENTS

| | | |
|---|---|---|
| 2009/0119221 A1 | 5/2009 | Weston et al. |
| 2009/0164326 A1 | 6/2009 | Bishop et al. |
| 2009/0173790 A1 | 7/2009 | Hart et al. |
| 2009/0222383 A1 | 9/2009 | Tato et al. |
| 2009/0307142 A1 | 12/2009 | Mardikar |
| 2010/0020971 A1 | 1/2010 | Hanks et al. |
| 2010/0057620 A1* | 3/2010 | Li .................. G06Q 20/202 |
| | | 705/71 |
| 2010/0057624 A1 | 3/2010 | Hurt et al. |
| 2010/0211469 A1 | 8/2010 | Salmon et al. |
| 2010/0243732 A1 | 9/2010 | Wallner |
| 2010/0262504 A1 | 10/2010 | Tamura |
| 2011/0176004 A1 | 7/2011 | Chaussade |
| 2011/0199308 A1 | 8/2011 | Nativel et al. |
| 2011/0321173 A1 | 12/2011 | Weston et al. |
| 2012/0023026 A1 | 1/2012 | Chen et al. |
| 2012/0066079 A1* | 3/2012 | Falzone ............ G06Q 20/202 |
| | | 705/16 |
| 2012/0197744 A1 | 8/2012 | Rose et al. |
| 2012/0242526 A1 | 9/2012 | Perez et al. |
| 2012/0254038 A1 | 10/2012 | Mullen |
| 2012/0286040 A1* | 11/2012 | Ko .................. G07F 7/0886 |
| | | 235/383 |
| 2012/0290420 A1 | 11/2012 | Close |
| 2013/0006847 A1 | 1/2013 | Hammad et al. |
| 2013/0050084 A1 | 2/2013 | Soffer |
| 2013/0144731 A1 | 6/2013 | Baldwin et al. |
| 2013/0153656 A1 | 6/2013 | Skiles |
| 2013/0155595 A1* | 6/2013 | Herring .............. G07G 1/0018 |
| | | 361/679.21 |
| 2013/0198086 A1 | 8/2013 | Mardikar |
| 2013/0246171 A1 | 9/2013 | Carapelli |
| 2013/0266141 A1* | 10/2013 | Kim ................. G06Q 20/4014 |
| | | 380/270 |
| 2013/0299574 A1 | 11/2013 | Theobald |
| 2014/0022211 A1* | 1/2014 | Karpin ................ G06F 3/044 |
| | | 345/174 |
| 2014/0047390 A1 | 2/2014 | Thorsander et al. |
| 2014/0071043 A1 | 3/2014 | Jung et al. |
| 2014/0078070 A1* | 3/2014 | Armstrong-Muntner ................... |
| | | G06F 3/044 |
| | | 345/173 |
| 2014/0089174 A1 | 3/2014 | Carapelli et al. |
| 2014/0095387 A1 | 4/2014 | Colnot |
| 2014/0096222 A1 | 4/2014 | Colnot |
| 2014/0097249 A1* | 4/2014 | Gomez .............. G06Q 20/341 |
| | | 235/440 |
| 2014/0101035 A1 | 4/2014 | Tanner et al. |
| 2014/0143089 A1 | 5/2014 | Campos et al. |
| 2014/0172607 A1 | 6/2014 | Skiles |
| 2014/0183260 A1* | 7/2014 | Sancak ............... G06Q 90/00 |
| | | 235/383 |
| 2014/0214688 A1 | 7/2014 | Weiner et al. |
| 2014/0252089 A1 | 9/2014 | Bostwick |
| 2014/0256251 A1 | 9/2014 | Caceres et al. |
| 2014/0283857 A1 | 9/2014 | Liu |
| 2015/0095134 A1* | 4/2015 | Parker ............... G06Q 20/202 |
| | | 705/14.38 |
| 2015/0095241 A1 | 4/2015 | Edwards |
| 2015/0100498 A1 | 4/2015 | Edwards |
| 2015/0161601 A1 | 6/2015 | Matsumoto et al. |
| 2015/0199882 A1 | 7/2015 | Fernando et al. |
| 2015/0261314 A1 | 9/2015 | Herring et al. |
| 2015/0324781 A1* | 11/2015 | Saitoh .............. G06Q 20/206 |
| | | 705/17 |
| 2015/0363757 A1 | 12/2015 | Mocko et al. |
| 2016/0005020 A1 | 1/2016 | Fernando et al. |
| 2016/0012465 A1 | 1/2016 | Sharp |
| 2016/0026990 A1 | 1/2016 | Rezayee et al. |
| 2016/0051067 A1 | 2/2016 | Law et al. |
| 2016/0070964 A1 | 3/2016 | Conrad |
| 2016/0117529 A1 | 4/2016 | Bedier et al. |
| 2016/0117659 A1 | 4/2016 | Bedier et al. |
| 2016/0117662 A1 | 4/2016 | Bedier et al. |
| 2016/0124627 A1 | 5/2016 | Beatty et al. |
| 2016/0125181 A1 | 5/2016 | Dai |
| 2016/0125376 A1 | 5/2016 | Beatty et al. |
| 2016/0148023 A1 | 5/2016 | Lamfalusi et al. |
| 2016/0275478 A1 | 9/2016 | Li et al. |
| 2017/0154334 A1 | 6/2017 | Lewis et al. |
| 2017/0221035 A1 | 8/2017 | Edwards et al. |
| 2017/0308882 A1 | 10/2017 | Bedier et al. |
| 2017/0311737 A1 | 11/2017 | Law et al. |
| 2017/0364888 A1 | 12/2017 | Bell et al. |
| 2018/0039965 A1 | 2/2018 | Han et al. |
| 2018/0174013 A1 | 6/2018 | Lee |
| 2018/0174391 A1 | 6/2018 | Weston et al. |
| 2018/0316815 A1 | 11/2018 | Douthat et al. |
| 2021/0240947 A1 | 8/2021 | Chen et al. |
| 2021/0319421 A1 | 10/2021 | Chen et al. |

FOREIGN PATENT DOCUMENTS

| | | |
|---|---|---|
| CA | 2 955 454 A1 | 1/2016 |
| CN | 106716470 A | 5/2017 |
| DE | 20320080 U1 | 4/2004 |
| EP | 0 895 203 A2 | 2/1999 |
| EP | 1 874 014 A2 | 1/2008 |
| FR | 2 812 744 A1 | 2/2002 |
| FR | 2 812 745 A1 | 2/2002 |
| FR | 2 834 156 A1 | 6/2003 |
| JP | H09231285 A | 9/1997 |
| JP | 2000-030146 A | 1/2000 |
| JP | 2000-276539 A | 10/2000 |
| JP | 2001-222595 A | 8/2001 |
| JP | 2002-074507 A | 3/2002 |
| JP | 2002-123771 A | 4/2002 |
| JP | 2002-279320 A | 9/2002 |
| JP | 2002-352166 A | 12/2002 |
| JP | 2002-358285 A | 12/2002 |
| JP | 2003-108777 A | 4/2003 |
| JP | 2003-281453 A | 10/2003 |
| JP | 2003-308438 A | 10/2003 |
| JP | 2004-054651 A | 2/2004 |
| JP | 2004-062733 A | 2/2004 |
| JP | 2004-078553 A | 3/2004 |
| JP | 2004-078662 A | 3/2004 |
| JP | 2004-199405 A | 7/2004 |
| JP | 4248820 B2 | 4/2009 |
| KR | 10-1999-0066397 A | 8/1999 |
| KR | 10-1999-0068618 A | 9/1999 |
| KR | 200225019 B1 | 3/2001 |
| KR | 10-2003-0005936 A | 1/2003 |
| KR | 10-2003-0005984 A | 1/2003 |
| KR | 10-2003-0012910 A | 2/2003 |
| KR | 200333809 B1 | 11/2003 |
| KR | 10-2004-0016548 A | 2/2004 |
| KR | 100447431 B1 | 8/2004 |
| KR | 200405877 B1 | 1/2006 |
| KR | 100649151 B1 | 11/2006 |
| KR | 10-2007-0107990 A | 11/2007 |
| KR | 100842484 B1 | 6/2008 |
| RU | 2284578 C1 | 9/2006 |
| WO | 1998/012674 A2 | 3/1998 |
| WO | 2000/011624 A1 | 3/2000 |
| WO | 2000/025277 A1 | 5/2000 |
| WO | 2001/086599 A2 | 11/2001 |
| WO | 2002/033669 A1 | 4/2002 |
| WO | 2002/043020 A2 | 5/2002 |
| WO | 2002/082388 A1 | 10/2002 |
| WO | 2002/084548 A1 | 10/2002 |
| WO | 2003/044710 A1 | 5/2003 |
| WO | 2003/079259 A1 | 9/2003 |
| WO | 2004/023366 A1 | 3/2004 |
| WO | 2006/131708 A1 | 12/2006 |
| WO | 2011/051757 A1 | 5/2011 |
| WO | 2012/078990 A1 | 6/2012 |

(56) References Cited

FOREIGN PATENT DOCUMENTS

| WO | 2015/001468 A1 | 1/2015 |
|---|---|---|
| WO | 2016/014346 A1 | 1/2016 |

OTHER PUBLICATIONS

De Bruin, Rossouw. A Wallet-Less Mobile Payment System Using Near Field Communication (NFC). University of Johannesburg (South Africa) ProQuest Dissertations Publishing, 2014. (Year: 2014).*
Non-Final Office Action dated May 21, 2015, for U.S. Appl. No. 14/592,102, of Chen, Y., et al., filed Jan. 8, 2015.
Final Office Action dated Dec. 9, 2015, for U.S. Appl. No. 14/592,102, of Chen, Y., et al., filed Jan. 8, 2015.
Non-Final Office Action dated Mar. 11, 2016, for U.S. Appl. No. 14/752,698, of Rezayee, A., et al., filed Jun. 26, 2015.
Non-Final Office Action dated Apr. 12, 2016, for U.S. Appl. No. 14/982,840, of Edwards, T., et al., filed Dec. 29, 2015.
Non-Final Office Action dated Jul. 20, 2016, for U.S. Appl. No. 14/848,123, of Guise, M., et al., filed Sep. 8, 2015.
Final Office Action dated Sep. 23, 2016, for U.S. Appl. No. 14/752,698, of Rezayee, A., et al., filed Jun. 26, 2015.
Notice of Allowance dated Oct. 24, 2016, for U.S. Appl. No. 14/982,840, of Edwards, T., et al., filed Dec. 29, 2015.
Final Office Action dated Jan. 27, 2017, for U.S. Appl. No. 14/848,123, of Guise, M., et al., filed Sep. 8, 2015.
Non-Final Office Action dated Mar. 31, 2017, for U.S. Appl. No. 15/241,901, of Edwards, T., et al., filed Aug. 19, 2016.
Notice of Acceptance for Australian Patent Application No. 2015349752, dated Jul. 3, 2017.
Non-Final Office Action dated Sep. 8, 2017, for U.S. Appl. No. 14/752,698, of Rezayee, A., et al., filed Jun. 26, 2015.
Notice of Allowance dated Oct. 30, 2017, for U.S. Appl. No. 15/241,901, of Edwards, T., et al., filed Aug. 19, 2016.
Non-Final Office Action dated Feb. 20, 2018, for U.S. Appl. No. 15/793,187, of Mocko, C.L., et al., filed Oct. 25, 2017.
Final Office Action dated Apr. 25, 2018, for U.S. Appl. No. 14/752,698, of Rezayee, A., et al., filed Jun. 26, 2015.
Notice of Allowance dated Jun. 18, 2018, for U.S. Appl. No. 15/793,187, of Mocko, C.L., et al., filed Oct. 25, 2017.
Non-Final Office Action dated Jun. 28, 2018, for U.S. Appl. No. 15/003,649, of Chen, Y., et al., filed Jan. 21, 2016.
Non-Final Office Action dated Jun. 29, 2018, for U.S. Appl. No. 15/003,580, of Chen, Y., et al., filed Jan. 21, 2016.
Advisory Action dated Jul. 5, 2018, for U.S. Appl. No. 14/752,698, of Rezayee, A., et al., filed Jun. 26, 2015.
Office Action for European Patent Application No. 15 825 575.2, dated Oct. 1, 2018.
Non-Final Office Action dated Jan. 10, 2019, for U.S. Appl. No. 14/752,698, of Rezayee, A., et al., filed Jun. 26, 2015.
Final Office Action dated Feb. 21, 2019, for U.S. Appl. No. 15/003,649, of Chen, Y., et al., filed Jan. 21, 2016.
International Search Report and Written Opinion for International Application No. PCT/US2015/040819, dated Oct. 13, 2015.
International Search Report and Written Opinion for International Application No. PCT/US2015/051082, dated Dec. 18, 2015.
International Search Report and Written Opinion for International Application No. PCT/US2015/051090 dated Dec. 21, 2015.
Extended European Search Report for European Patent Application No. 15825575.2, dated Nov. 28, 2017.
Summons to Oral Proceeding for European Patent Application No. 15825575.2, dated Mar. 6, 2019.
Non-Final Office Action dated Apr. 2, 2019, for U.S. Appl. No. 15/003,580, of Chen, Y., et al., filed Jan. 21, 2016.
"Connection of Terminal Equipment to the Telephone Network," FCC 47 CFR Part 68, Retrieved from the URL: http://www.tscm.com/FCC47CFRpart68.pdf, on Sep. 24, 2019 Oct. 1, 1999 Edition.
"Embedded FINancial transactional IC card READer," Retrieved from the URL: https://cordis.europa.eu/project/rcn/58338/factsheet/en.
Geethapriya Venkataramani and Srividya Gopalan., "Mobile phone based RFID architecture for secure electronic payments using RFID credit cards," 2007 IEEE, (ARES'07).
"Guideline for the Use of Advanced Authentication Technology," FIPS 190, Sep. 28, 1994.
"Identification cards—Recording technique—Part 4—Location of read-only magnetic tracks—Track 1 and 2," ISO/IEC 7811-4:1995, International Organization for Standardization, Aug. 1995.
Jerome Svigals., "The Long Life and Imminent Death of the Mag-stripe Card," IEEE Spectrum, vol. 49, Issue 61, Jun. 2012.
"Magensa's Decryption Services and MagTek's MagneSafe™ Bluetooth Readers Selected by eProcessing Network to Implement Secure Customer Card Data with Mobile Devices," Retrieved from the URL: https://www.magnensa.net/aboutus/articles/eProcessing-rev1.pdf Apr. 14, 2008.
Martha E. Haykin et al., "Smart Card Technology: New Methods for Computer Access Control," NIST Special Publication 500-157, Sep. 1988.
"MSP430x1xx Family User's Guide," (including 2016 correction sheet at 2), Texas Instruments Inc., 2006.
Spegele, Joseph Brain., "A Framework for Evaluating Application of Smart Cards and Related Technology Within the Department of Defense," Naval Postgraduate School, Jan. 1995.
Stephen A. Sherman et al., "Secure Network Access Using Multiple Applications of AT&T's Smart Card," AT&T Technical Journal, Sep./Oct. 1994.
Loisel Y., "Designing Next-Generation Payment Terminals That Meet PCI PTS 3.x Requirements," Application note 4809, Maxim Integrated, Retrieved from URL: https://www.maximintegrated.com/en/app-notes/index.mvp/id/4809, dated May 19, 2011.
Notice of Allowance dated Jul. 19, 2019, for U.S. Appl. No. 14/752,698, of Rezayee, A., et al., filed Jun. 26, 2015.
Final Office Action dated Oct. 18, 2019, for U.S. Appl. No. 15/003,580, of Chen, Y., et al., filed Jan. 21, 2016.
Non-Final Office Action dated Dec. 12, 2019, for U.S. Appl. No. 16/146,943, of Mocko, C.L., et al., filed Sep. 28, 2018.
Non-Final Office Action dated Dec. 27, 2019, for U.S. Appl. No. 15/003,649, of Chen, Y., et al., filed Jan. 21, 2016.
Advisory Action dated Jan. 6, 2020, for U.S. Appl. No. 15/003,580, of Chen, Y., et al., filed Jan. 21, 2016.
Notice of Allowance dated Mar. 25, 2020, for U.S. Appl. No. 16/146,943, of Mocko, C.L., et al., filed Sep. 28, 2018.
Chen et al., "The use of multiple slate devices to support active reading activities", ProQuest Dissertations Publishing, pp. 1-14 (2012).
Kalyani, Amit B. "Performance Analysis of Hybrid Coupling Interworking Architecture", International Journal of Advanced Research in Computer Science, Udaipur vol. 3, Issue 5, Sep. 2012, pp. 1-8.
Final Office Action dated Sep. 30, 2020, for U.S. Appl. No. 15/003,649, of Chen, Y., et al., filed Jan. 21, 2016.
Advisory Action dated Dec. 7, 2020, for U.S. Appl. No. 15/003,649, of Chen, Y., et al., filed Jan. 21, 2016.
Notice of Allowance dated Mar. 26, 2021, for U.S. Appl. No. 15/003,649, of Chen, Y., et al., filed Jan. 21, 2016.
Non-Final Office Action dated Sep. 30, 2021, for U.S. Appl. No. 16/795,402, of Chen, Y., et al., filed Feb. 19, 2020.
Final Office Action dated Apr. 27, 2022, for U.S. Appl. No. 16/795,402, of Chen, Y., et al., filed Feb. 19, 2020.

* cited by examiner

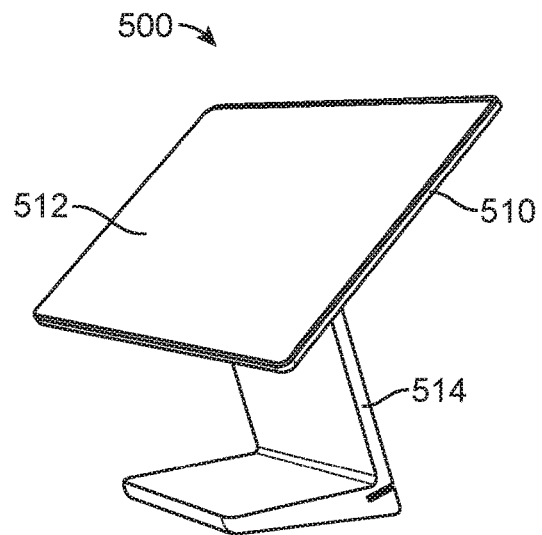
FIG. 5
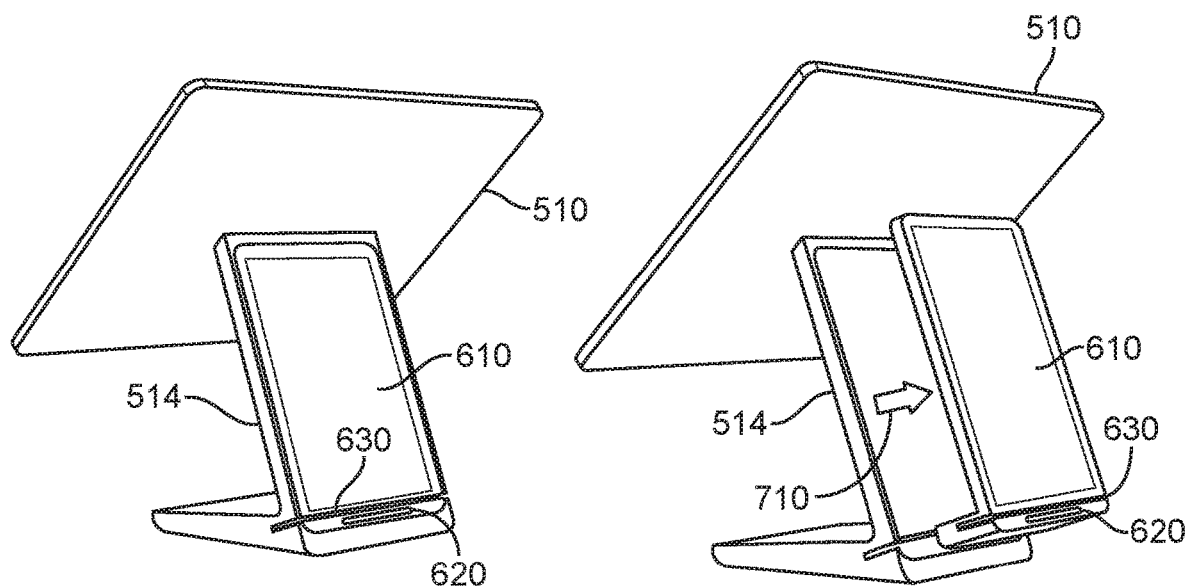
FIG. 6
FIG. 7

POINT OF SALE SYSTEM

CROSS-REFERENCE TO RELATED APPLICATIONS

This application is a continuation of U.S. patent application Ser. No. 15/003,580, entitled, "POINT OF SALE SYSTEM", filed on Jan. 21, 2016, which is a continuation of U.S. patent application Ser. No. 14/592,102, entitled, "POINT OF SALE SYSTEM", filed on Jan. 8, 2015, which claims the benefit of U.S. Provisional Patent Application No. 62/053,029, entitled "POINT OF SALE SYSTEM", filed on Sep. 19, 2014, all of which are hereby expressly incorporated herein by reference in their entireties.

BACKGROUND

Consumers can interact with merchants to conduct various financial payment transactions. For example, a consumer can conduct a transaction with a merchant at a point-of-sale system using cash, a transaction card, or other transaction instrument. Conventional systems can include expensive and bulky specialized equipment and financial transaction electronics, as may include a card reader for payment cards (e.g., debit or credit cards), a cash drawer, monitors, keyboards, and various other electronic devices. Oftentimes, however, this equipment can be costly and large, requiring additional space and resources. Further, in retail stores where space is limited, a merchant may not require all components that come with a conventional point-of-sale system or at least may find it desirable to piece together a modular or mobile system to streamline the checkout experience. Further still, merchants may find approaches to conducting a financial transaction using conventional systems burdensome, where during a transaction, if a customer pays by credit card, the merchant has to enter a transaction amount and the merchant or the customer has to swipe the credit card in the card reader. Further, many transactions require that the customer sign a physical receipt, electronically approve a transaction, e.g., by pressing an approve button on a user interface, electronically sign for the transaction, e.g., with a stylus or finger on an electronic signature capture device with a touch sensitive pad, or enter an authorizing personal identification number (PIN), many of which techniques require additional financial transaction electronics and time.

BRIEF DESCRIPTION OF THE DRAWINGS

In order to describe the manner in which features of the disclosure can be obtained, a more particular description of the principles will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which:

FIG. 5 illustrates an example point-of-sale system as viewed from a front perspective view, including a first terminal and a second terminal that are detachably mated together and shown in a fixed position, in accordance with an embodiment;

FIG. 6 illustrates the example point-of-sale system of FIG. 5 as viewed from a back perspective view, in accordance with an embodiment;

FIG. 7 illustrates the example point-of-sale system of FIG. 5 as viewed from the back perspective view, and showing the second terminal being separated from the first terminal, in accordance with an embodiment;

DETAILED DESCRIPTION

Systems and methods in accordance with various embodiments of the present disclosure overcome one or more of the above-referenced and other deficiencies in conventional approaches to conducting financial transactions. In particular, in accordance with various embodiments, approaches provide for a point-of-sale system configured to enhance financial transactions by streamlining and simplifying components needed in performing a financial transaction. The point-of-sale system includes a secure enclave for accurately receiving and handling secure data provided into the point-of-sale system.

For example, in accordance with various embodiments, the point-of-sale system is a dual-screen stand assembly that includes a merchant terminal and a consumer (or "customer" as used interchangeably herein) terminal. The merchant terminal and the consumer terminal can be mated together in a fixed position to form a single unitary point of sale system including a merchant facing terminal and a consumer facing terminal, or terminals can be separated from each other and arranged in a separated position with each terminal being physically independent of the other. The merchant terminal supports a merchant computing device and is oriented in a merchant-facing direction. The consumer terminal is detachably mated to the merchant terminal and supports a consumer computing device that is oriented in a consumer-facing direction. The point-of-sale system also includes a card reader as part of the customer terminal to perform a payment. The card reader is configured to accept swipe cards, chip cards (Europay, MasterCard and Visa hereinafter "EMV") or contactless (low power bluetooth or near-field communication, hereinafter "NFC") payments.

The point-of-sale system is configured to present an interface to the merchant terminal. Information regarding an item for sale or a service being provided is received at the merchant terminal. The information is then sent to the consumer terminal and a check-out procedure is initiated. The payment total is sent to the consumer terminal and a payment card can be inserted into the consumer terminal. The consumer terminal has a display that is specific to the type of payment card used so that when a swipe card is inserted, the display provides the appropriate signature, and when a chip-type card is inserted, an appropriate PIN display is provided on the consumer terminal. A secure enclave can be provided to securely store entries that are, for example, entered into a secure enclave of a portable computing device at the consumer terminal. Payment information acquired from the payment card, and the appropriate verification thereof, is provided to a payment system. Payment confirmation is received from the payment system, which can be displayed on one or both of the merchant terminal and the consumer terminal.

Figure 1:
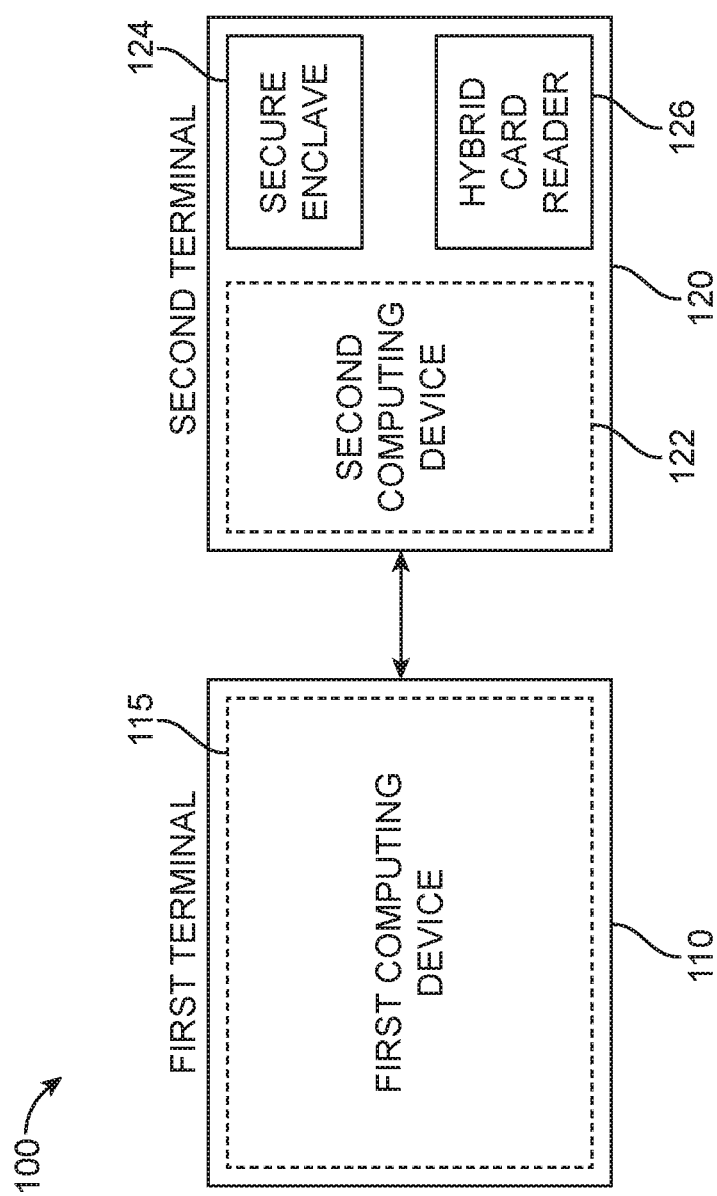
FIG. 1 illustrates an example block diagram showing a first terminal and a second terminal used in a point-of-sale system in accordance with various embodiments.

Other advantages, variations, and functions are described and suggested below as may be provided in accordance with the various embodiments. Reference is now made to FIG. 1 illustrating an example point-of-sale system 100 including a first terminal 110 including a first computing device 115 (e.g., a tablet computer, a mobile phone, etc.). The computing device can be integrally provided as a component of the first terminal to form a unitary structure or a computing device provided by a manufacturer that is separately provided and inserted into the terminal by the appropriate user. The computing device can include, for example, a processor, a touch-screen display, and a wireless local area network receiver, a physical interface for electronic communication, and a physical interface to receive power (which can be integrated with the physical interface for electronic communication, e.g., in a Universal Serial Bus (USB) connector or other proprietary connector). The first terminal 110 is detachably mated to a second terminal 120.

The computing device can run a merchant application or other financial transaction software that can provide functionality to facilitate a point-of-sale such as by enabling payment transactions. For example, in accordance with various embodiments, the merchant application can be downloaded and installed on the computing device. The software can be configured to operate with a card reader, where an individual can complete a financial transaction by swiping a magnetic stripe card through the card reader or dipping a chip-type card into the card reader that is connected to the computing device. In this example, the financial transaction can be any transaction that involves receiving or sending payment from one person or entity to another. The magnetic stripe card can be, for example, a credit card, a debit card, or other types of payment authenticating pieces having a magnetic stripe storing information sufficient to carry out the financial transaction. In accordance with various embodiments, the card reader can be integrated into the consumer terminal to allow the consumer to properly provide the payment card. However, in some embodiments, a separate card reader can be used, such as a miniaturized card reader that is easily connectable to the computing device.

The first terminal 110 and second terminal 120 can be in communication with each other via wired or wireless link. In this example, the first terminal 110 represents a terminal used by a merchant conducting a transaction at a point-of-sale system with a consumer using, for example, a payment card via the second terminal 120. It is noted that although a payment card is used in some embodiments, transactions can also be conducted through a card-less payment account that is linked to the payment card. Other transactions include person-to-person, account-to-account, electronic cash, among others. It should be further noted that although a credit card is shown to conduct transactions, approaches described herein apply to other types of financial payment instruments including, for example, debit cards, chip-type cards, and card-less payment accounts. As described, in conventional point-of-sale systems, the equipment can be costly and large, requiring additional space and resources. Further, in retail stores where space is limited, a merchant may find it less desirable to have such a large system. Accordingly, in accordance with various embodiments, approaches provide for a streamlined point-of-sale system with a merchant terminal and a consumer terminal detachably mated from the merchant terminal. It is further desirable to securely process and store entries securely entered into the consumer terminal.

The second terminal 120 supports a second computing device 122. The second computing device 122 is shown integrally formed within the second terminal 120 to provide a single one-piece structure. In some embodiments, another tablet provided separately by the same or another manufacturer, can be inserted into the second terminal 120. The second terminal 120 includes a secure enclave 124 for securely processing and storing entries into the second terminal 120, as described in greater detail herein. The second terminal 120 also includes a card reader 126 configured to read both magnetic swipe cards and chip-type cards. Although shown here as a single hybrid slot capable of reading both card types, two readers, in the form of two separate slots, can be provided with one "swipe" slot for receiving a magnetic swipe-type card and a "dip" slot for receiving a chip-type card.

Figure 2:
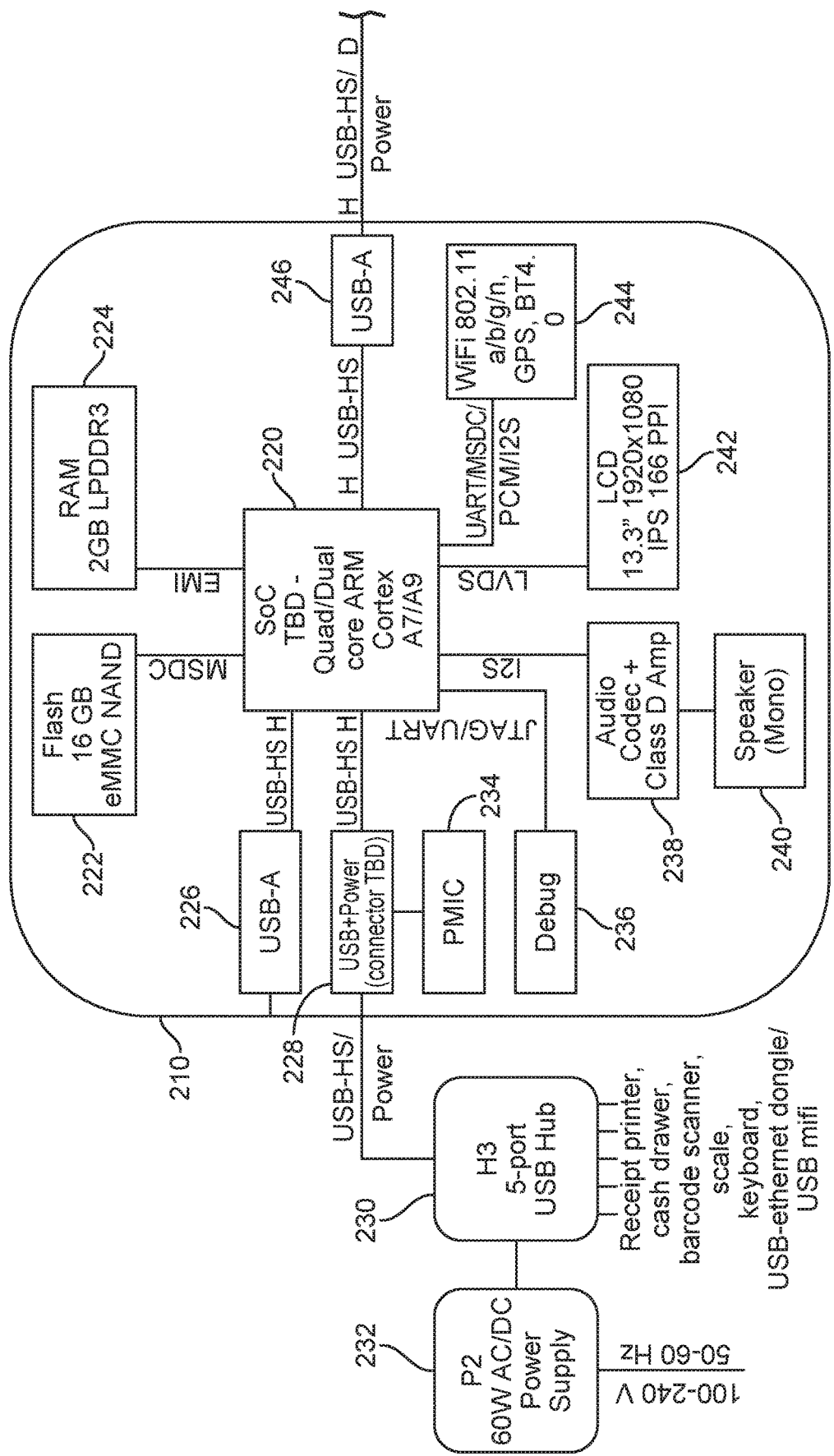
FIG. 2 illustrates an example schematic diagram of components of each terminal in the point-of-sale system in accordance with an embodiment.
Figure 2:
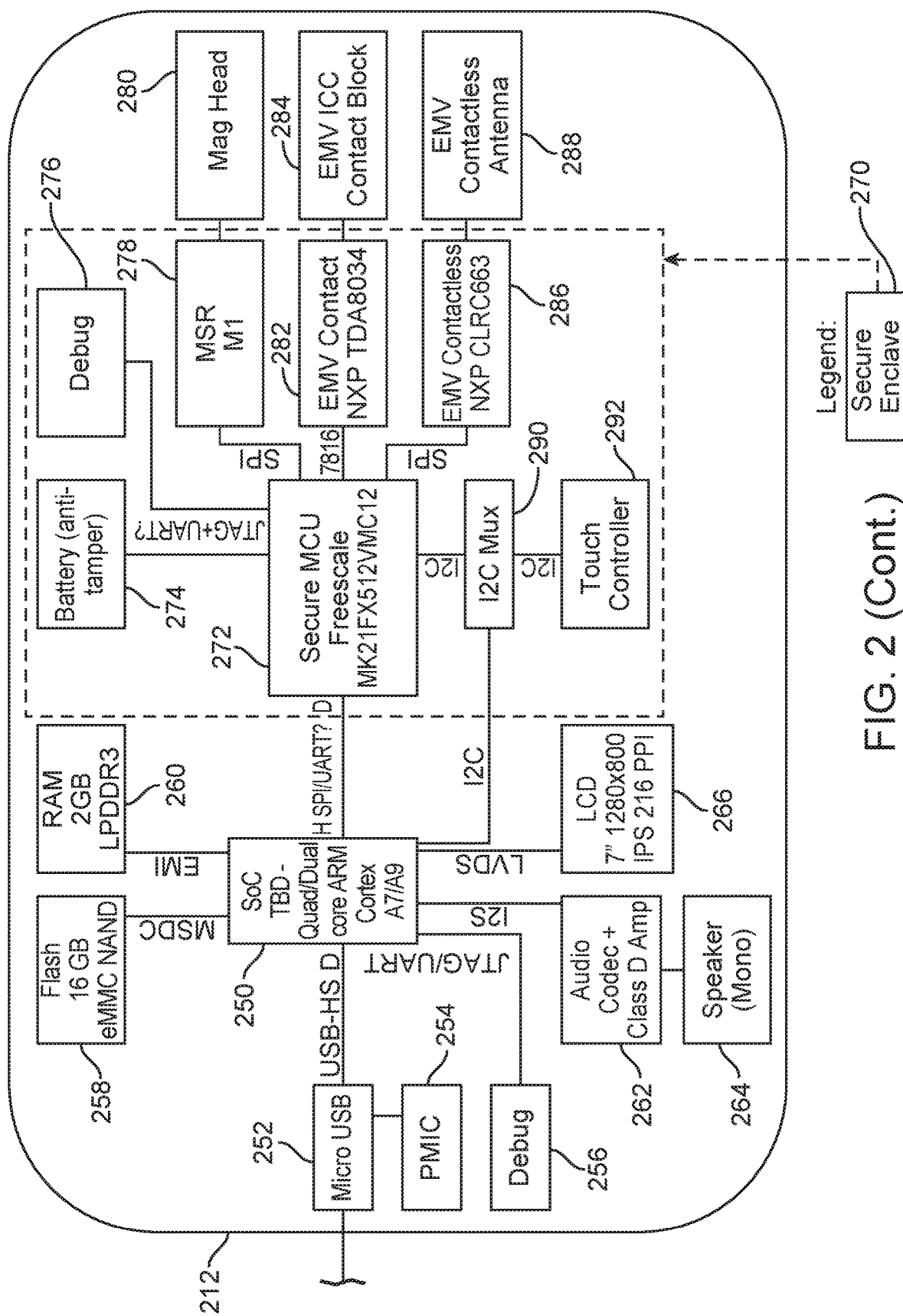

Reference is now made to FIG. 2 illustrating an example schematic diagram of components of each terminal in the point-of-sale system in accordance with an embodiment. The point-of-sale system 200 includes a merchant terminal 210 and a consumer terminal 212. The merchant terminal 210 includes a SoC (System-on-chip) processor 220 and associated flash memory 222 and RAM 224. A USB-A port 226 is provided for connecting other devices or components to the merchant terminal 210 as appropriate. A USB+Power port 228 is provided connected to a 5-port USB Hub 230 for various peripherals associated with a point-of-sale system, including a receipt printer, cash drawer, barcode scanner, scale, keyboard, USB-ethernet dongle/USB mifi, and other point-of-sale peripheral components known in the art. While both a USB-A port and a USB+Power port are separately identified, such should not be considered limitation. Merchant terminal can have any number of USB ports, and the ports can be of any suitable characteristics. A power supply 232 can be provided as power through the hub H3 230 via connector 228 on the merchant terminal 210. A debug module 236 is provided for appropriate debugging of the merchant terminal 210 and the various components thereof. An audio amplifier 238 is provided and a speaker 240 for providing the appropriate audio for the merchant terminal 210. A display 242 can be connected to the processor 220, for example a 13.3-inch LDC display having a resolution of 1920×1080 IPS 166 PPI. The display 242 provides the interfaces and outputs to the merchant terminal 210 to be viewed by a merchant. A wifi receiver 244 is in communication with the processor 220 to perform the wireless communication, for example, with the consumer terminal and other point-of-sale system components, or for example a payment system. And a USB port 246 is provided for detachably connecting the merchant terminal 210 to the consumer terminal 212. The term "detachably" is intended to refer to the ability for the merchant terminal to be connected to the consumer terminal but also configured to being detached from the consumer terminal when desired for storage, upgrades, or other uses. This mating between the terminals can be through wired connections shown or wirelessly, in some embodiments.

The consumer terminal 212 includes a SoC processor 250 connected to the micro USB 252 for communication with the merchant terminal 210. A Power Management Integrated Circuit (PMIC) 254 is in communication with the micro USB connector 252. A PMIC is an integrated circuit for managing power requirements of the host system. A debug module 256 is provided for the processor 250 for the appropriate debugging of the consumer terminal 212 and the various components thereof. The processor 250 is coupled to flash memory 258 and RAM 260 for appropriate storage and processing of data. An audio amplifier 262 and speaker 264 is provided for any audio for the customer on the customer terminal 212. A display 266 is provided, such as a 7-inch LCD touch-screen display having a resolution of 1280×800 IPS 216 PPI. The display 266 provides interfaces and the outputs of the point-of-sale system to the consumer terminal 212. A secure enclave 270 is included in the consumer terminal 212. The secure enclave includes a secure MCU 272, an anti-tamper battery 274, and a secure debug module 276. The MCU 272 receives inputs from the Magnetic Stripe Reader (MSR) 278 which are read by a magnetic head reader 280. Inputs are also received from EMV contact 282 and processed by an EMV contact block 284. Inputs from a contactless EMV are received from an EMV contactless antenna 288 and processed by the EMV contactless block 286. The contactless antenna 288 is dual-use in some embodiments, and configured to receive input from EMV cards and NFC (near field communication) cards, as well as other NFC devices, such as smart phones or other devices configured to process payment transactions. All inputs received by the consumer terminal at the touch controller 292 (for example, as entries into a payment application or a register-buddy application in communication with the merchant terminal), are sent to the secure enclave and the multiplexer 290 determines if the entries should go directly to the non-secure memory, or if further processing (for example, encryption) is needed, and the entries are sent to secure memory. A multiplexer 290 receives inputs from a touch controller 292 and directs inputs received in a non-secure portion of the GUI into non-secure memory, and directs inputs received in a secure portion of the GUI into secure memory. In some embodiments, the main processor on the merchant terminal and the consumer terminal will each run their own operating system (including possibly two different copies of the same operating system, different versions of the same operating system, or different operating systems altogether, etc.).

Figure 3:
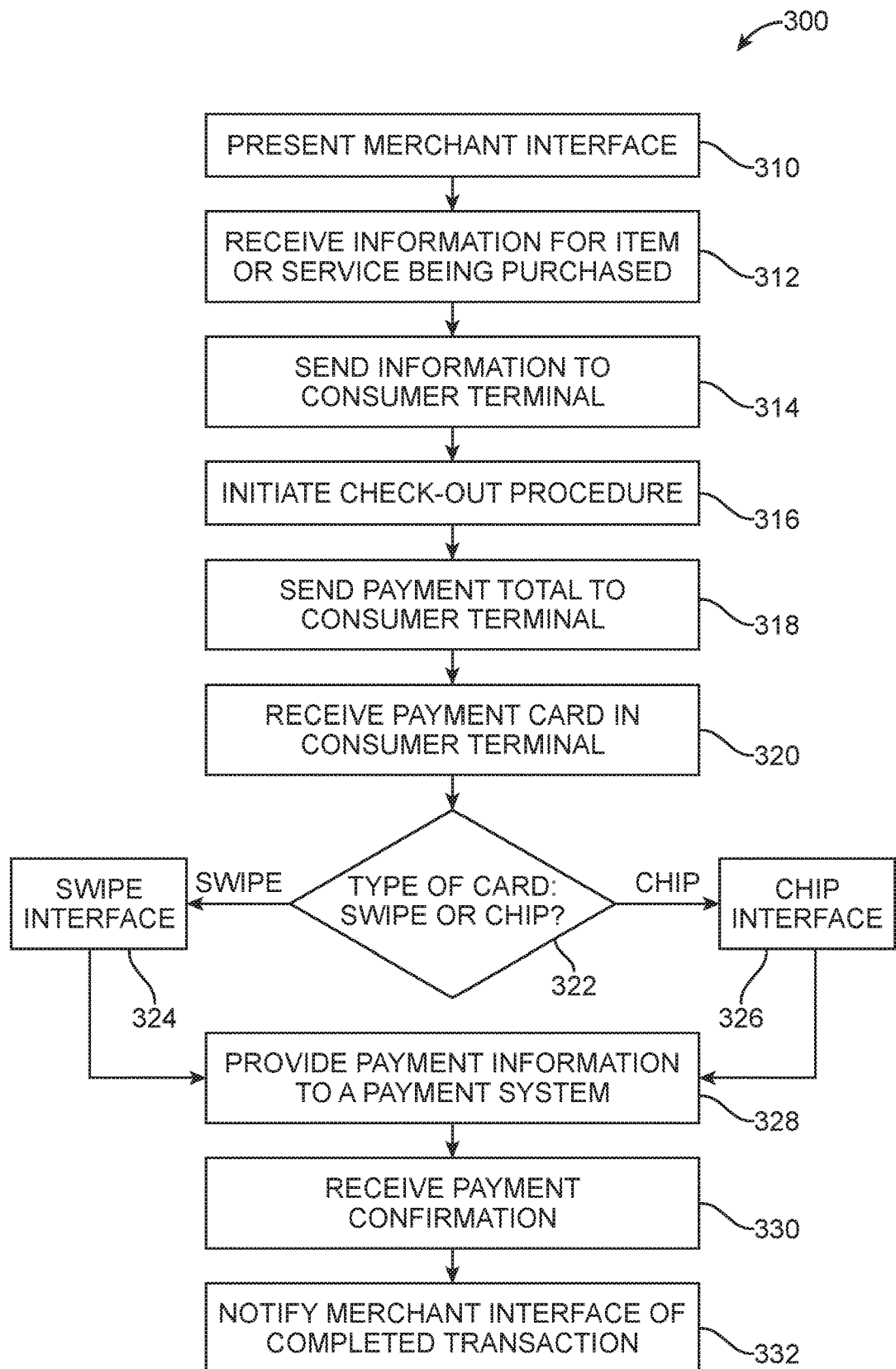
FIG. 3 illustrates an example process for conducting a financial payment transaction in accordance with various embodiments.

FIG. 3 illustrates an example process for conducting a financial payment transaction in accordance with various embodiments. In the example process 300, a merchant interface is presented 310 and information regarding an item or a service being purchased is received 312. Information is sent to a consumer terminal 314 and a check-out procedure is initiated 316. The payment total is sent to the consumer terminal 318 (for example, displayed on display 266) and the payment card is received in the consumer terminal 320. The type of card (swipe, EMV, NFC, etc.) being used is determined 322. A payment interface is presented to the consumer on the consumer terminal based upon the type of payment card used. Accordingly, for example, if a magnetic-stripe swipe-type card is used, then 324 an interface is presented to the user to allow for signature entry, and if a chip-type card is used, then 326 an interface is presented to the user to allow for PIN entry or other secure verification of the use of the card. Payment information is provided to a payment system 328 and a payment confirmation is received at 330. This can occur via Wifi (244) or direct connection via USB (for example 228 in FIG. 2) in some embodiments. Note that the payment confirmation could also be a confirmation that the payment has been denied. The merchant interface is notified of the completed transaction 332. The consumer interface can also be notified of the completed transaction in some embodiments.

Figure 4:
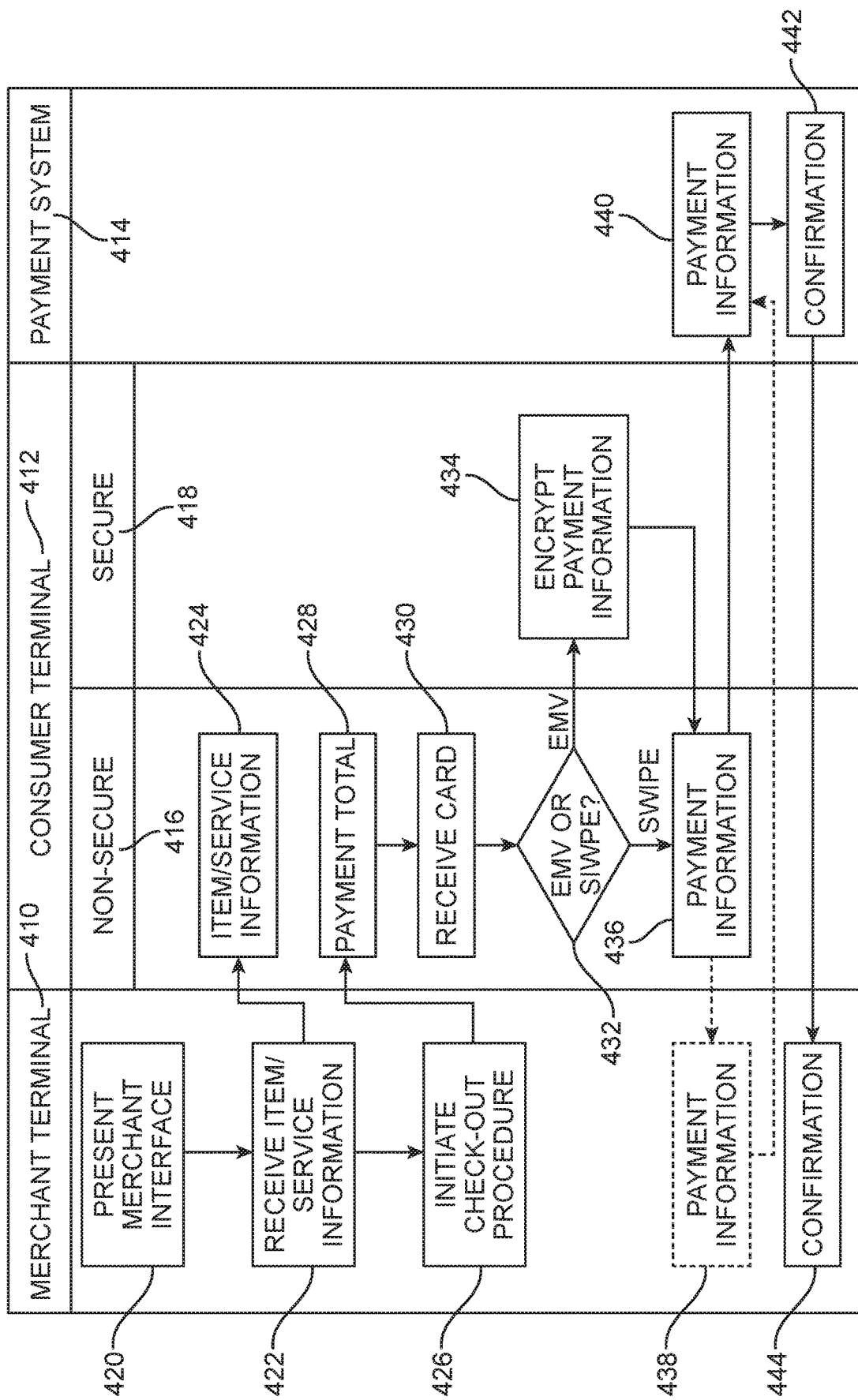
FIG. 4 illustrates an example diagram of flow of data between the components of the point-of-sale system in accordance with an embodiment.

FIG. 4 illustrates an example diagram of flow of data between the components of the point-of-sale system in accordance with an embodiment. The flow of data between the merchant terminal 410, the consumer terminal 412 and the payment system 414 are shown. The consumer terminal 412 includes the flow of data to and from both the non-secure processor 416 and the secure processor 418. The non-secure processor 416, for example, can be the processor 250 of FIG. 2, and the secure processor, for example, can be the secure MCU 272 in FIG. 2.

In accordance with the example diagram, a merchant interface is presented 420 at the merchant terminal 210. The item or service information is received 422 at the merchant terminal 410 and then provided to the non-secure processor 416 to display the information 424 on the consumer terminal 412. The check-out procedure 426 is initiated by the merchant terminal 410 once all items and/or services have been entered. The payment total 428 is then provided to the non-secure processor 416 to be displayed on the consumer terminal 412. A payment card is received 430 and the type of card is determined 432. If the payment card is an EMV card, the payment information is encrypted 434 by the secure processor 418. The encrypted payment information 404 is then sent to the non-secure processor 416 to be provided either directly 440 to the payment system 414, or indirectly send the payment information 438 via the merchant terminal 410 to the payment system 414. A payment confirmation is generated 442 by the payment system 414 and this payment confirmation is provided 444 to the merchant terminal 410.

FIGS. 5-8 illustrate a first example point-of-sale system 500. FIG. 5 illustrates an example point-of-sale system 500 as viewed from a front perspective view, including a first terminal and a second terminal that are detachably mated together and shown in a fixed position, in accordance with an embodiment. The point-of-sale system 500 includes a first terminal 510 configured, for example, to be a merchant terminal in a merchant-facing direction. The first terminal 510 includes a first computing device 512 and a base 514 into which the second terminal is detachably received. The first computing device 512 can be a separate device that is inserted into the terminal or formed integral into the terminal as a single, unitary structure.

FIG. 6 illustrates the example point-of-sale system of FIG. 5 as viewed from a back perspective view, in accordance with some embodiments. The base 514 of the first terminal 510 detachably receives the second terminal 610. The second terminal 610 can include a first "dip slot" card reader 620 configured to read chip-type cards and a second "swipe slot" card reader 630 configured to read magnetic swipe-type cards. The term "dip slot" refers to a slot or other opening configured to receive or otherwise read a chip-type card via contact or contact-less EMV or NFC communication. The term "swipe slot" refers to a slot or other opening configured to receive a magnetic swipe-type card. In some embodiments, the card reader 620 and the card reader 630 can be replaced with a single hybrid card reader configured to accept both chip-type card and magnetic stripe-type cards.

FIG. 7 illustrates the example point-of-sale system of FIG. 5 as viewed from the back perspective view, and showing the second terminal 610 being separated with ease from the first terminal 610, as shown by arrow 710.

Figure 8:
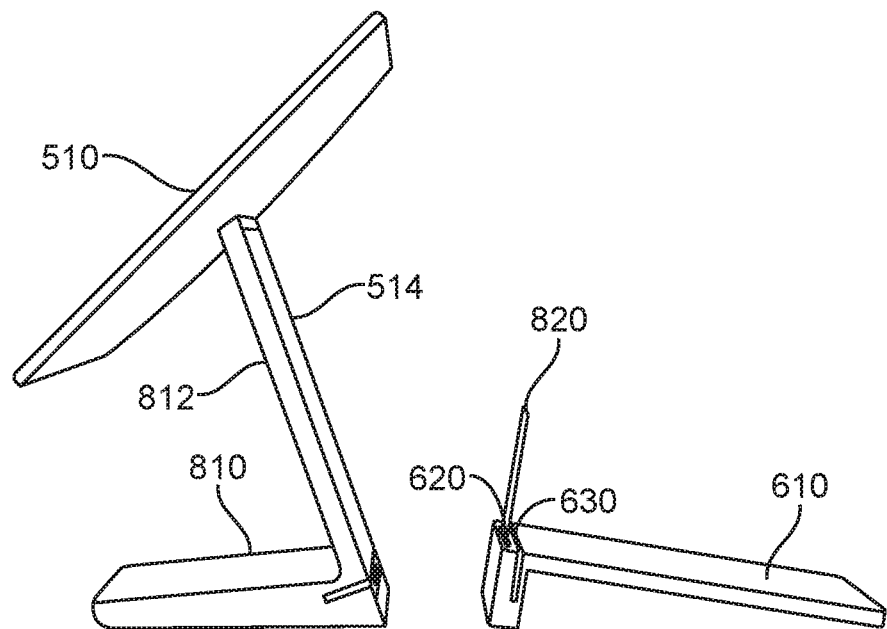
FIG. 8 illustrates the example point-of-sale system of FIG. 5 as viewed from a side perspective view and showing the second terminal completely separated from the first terminal, in accordance with an embodiment.

FIG. 8 illustrates the example point-of-sale system of FIG. 5 as viewed from a side perspective view and showing the second terminal completely separated from the first terminal. In this view, each terminal can be physically independent of the other and arranged in a separated position, or mated together as shown in FIG. 5. When separated as shown in FIG. 8, the first terminal and the second terminal are in communication with each other or otherwise mated together via wired or wireless communication. As shown in FIG. 8, the first terminal 510 includes a base 514 having a substantially flat portion 810 that contacts a surface for supporting the first terminal 510 and an upper portion 812. A payment card 820 is shown inserted in the card reader 620 of the second terminal 620. The thin wedge shape of the second terminal 620 welcomes customers to pick up and hold the second terminal 620 for usage of the terminal.

Figure 9:
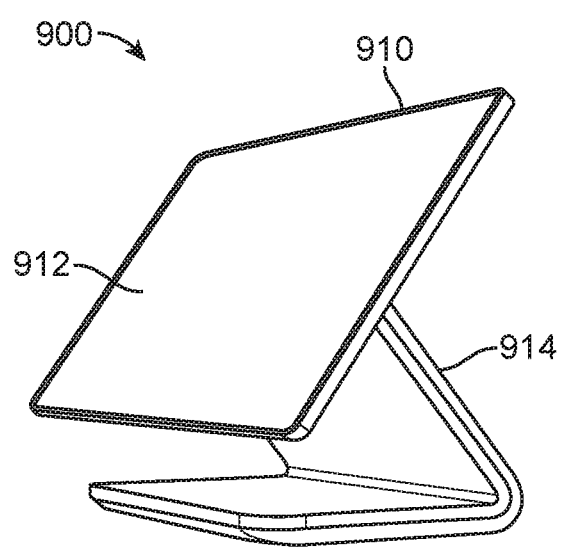
FIG. 9 illustrates another example point-of-sale system as viewed from a front perspective view, including a first terminal and a second terminal that are detachably mated together and shown in a fixed position, in accordance with an embodiment.

FIGS. 9-12 illustrate an example embodiment of a point-of-sale system 900. FIG. 9 the point-of-sale system 900 as viewed from a front perspective view, including a first terminal and a second terminal that are detachably mated together and shown in a fixed position. The first terminal 910 supports a computing device 912 (e.g., a tablet computer or a mobile device, etc.), or in some embodiments has the computing device formed integrally herewith to form a unitary structure. The first terminal 910 also has a base 914 that detachably receives the second terminal.

Figure 10:
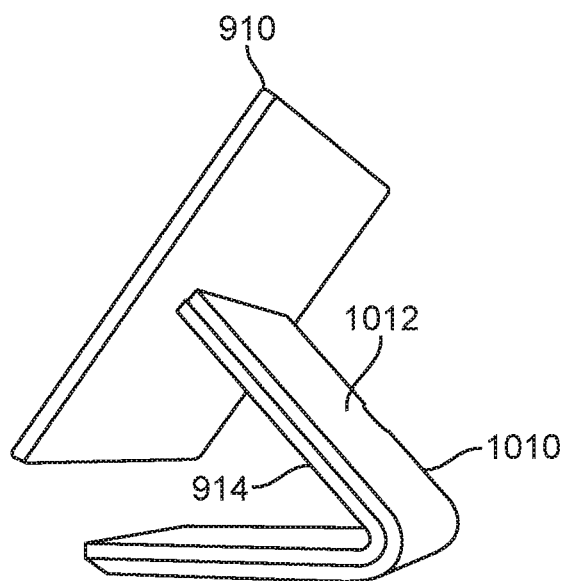
FIG. 10 illustrates the example point-of-sale system of FIG. 9 as viewed from a back perspective view, in accordance with an embodiment.

FIG. 10 illustrates the example point-of-sale system of FIG. 9 as viewed from a back perspective view. The point-of-sale system includes the first terminal 910 and a second terminal 1010. In an example embodiment the first terminal 910 is a merchant terminal oriented in a merchant-facing direction and the second terminal 1010 is a consumer terminal oriented in a consumer-facing direction. The second terminal 1010 supports a second computing device 1012, which can be a separate component or integrated directly into the second terminal to form a unitary structure.

Figure 11:
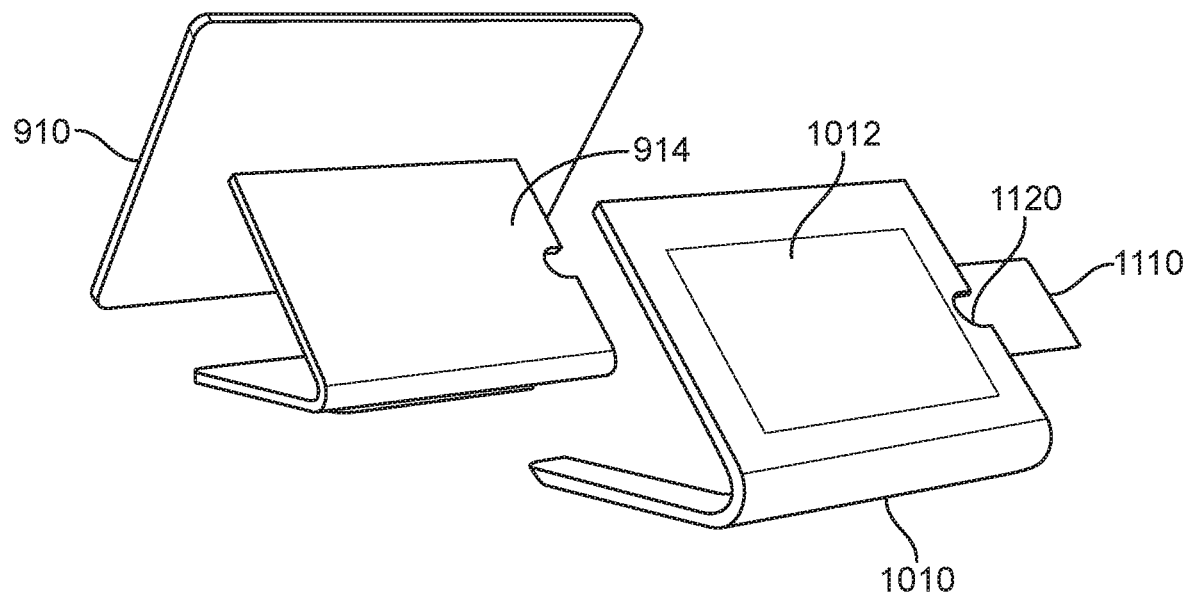
FIG. 11 illustrates the example point-of-sale system of FIG. 9 as viewed from the back perspective view, and showing the second terminal being separated from the first terminal, in accordance with an embodiment.

FIG. 11 illustrates the example point-of-sale system of FIG. 9 as viewed from the back perspective view, and showing the second terminal 1010 being separated from the first terminal 910. The second terminal 1020 can include a hybrid card reader 1120 for receiving a payment card 1110 and can have a groove to facilitate the insertion and removal of the payment card 1110. The hybrid card reader 1120 is configured to read both chip-type card and magnetic strip-type cards. When in the separated position shown in FIG. 11, each terminal functions as its own stand for the point-of-sale system, or optionally can function as a single stand as shown in FIG. 8.

Figure 12:
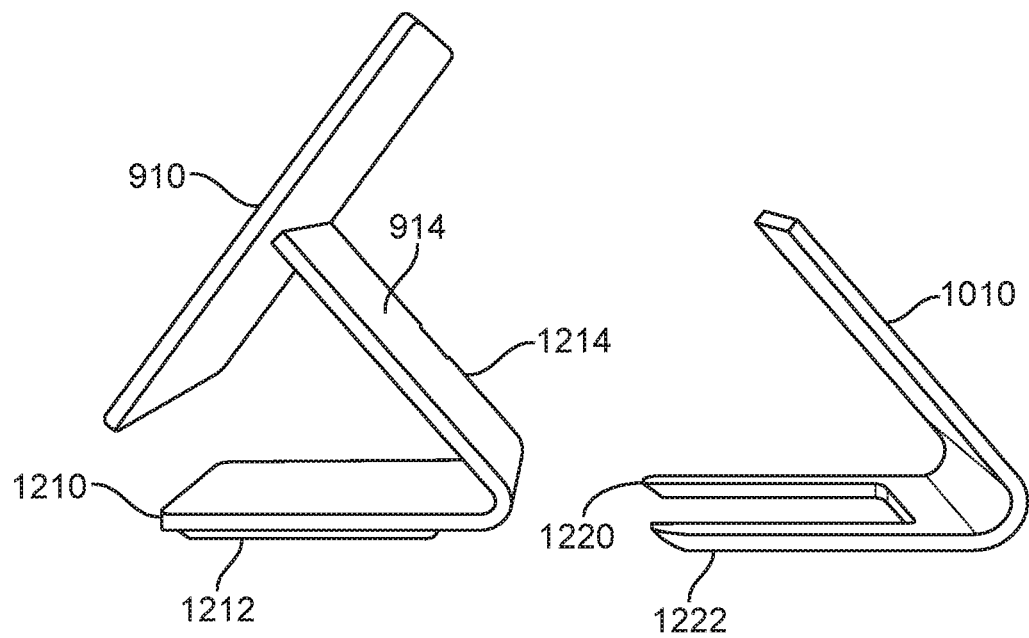
FIG. 12 illustrates the example point-of-sale system of FIG. 9 as viewed from a side perspective view and showing the second terminal completely separated from the first terminal with the point-of-sale system in a separated position, in accordance with an embodiment.

FIG. 12 illustrates the example point-of-sale system of FIG. 9 as viewed from a side perspective view and showing the second terminal 1010 completely separated from the first terminal 910 in a separated position. The first terminal 910 includes a base 910 having a substantially flattened portion 1210 having a base 1212 that contacts a surface for supporting the first terminal 910. The first terminal 910 also includes a portion 1214 that connects the base to the device-holding or device-integrated portion of the terminal. The base 1212 engages with the legs 1220 and 1222 of the second terminal 1010.

Figure 13:
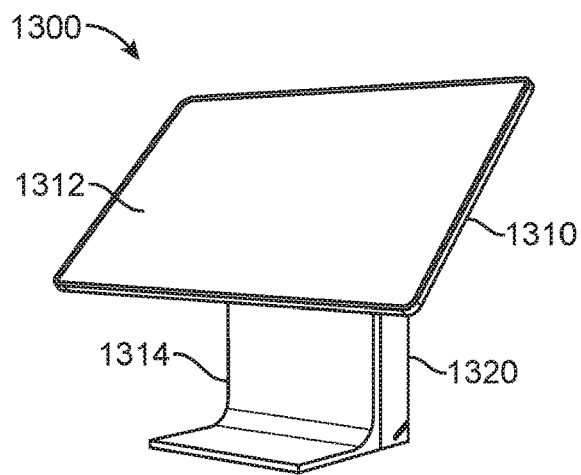
FIG. 13 illustrates another example point-of-sale system as viewed from a front perspective view, including a first terminal and a second terminal that are detachably mated together and shown in a fixed position, in accordance with an embodiment.

FIGS. 13-16 illustrate an example embodiment of a point-of-sale system 1300. FIG. 13 illustrates an example point-of-sale system 1300 as viewed from a front perspective view, including a first terminal 1310 and a second terminal 1320 that are detachably mated together and shown in a fixed position. In an example embodiment, the first terminal 1310 is configured to be a merchant terminal oriented in a merchant-facing direction and the second terminal 1320 is configured to be a consumer terminal oriented in a consumer-facing direction. The first terminal 1310 includes a first computing device 1312 and a base 1314 into which the second terminal 1320 is detachably received.

Figure 14:
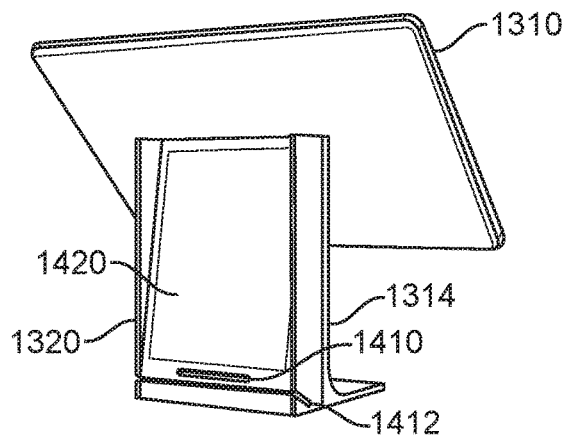
FIG. 14 illustrates the example point-of-sale system of FIG. 13 as viewed from a back perspective view, in accordance with an embodiment.

FIG. 14 illustrates the example point-of-sale system of FIG. 13 as viewed from a back perspective view. The second terminal 1320 is received within the base 1314 of the first terminal 1310. The second terminal 1320 includes a first "dip slot" card reader 1410 configured to read EMV chip-type cards a second "swipe slot" card reader 1420 configured to read magnetic stripe-type cards. One or both of the card readers 1410, 1420 can be configured to read contactless payment cards. In some embodiments, the two card readers 1410, 1420 can be replaced with a single hybrid card reader configured to read both chip-type cards and magnetic strip-type cards. The second terminal 1320 also includes, as a separate component or formed integrally within the terminal, a computing device 1420 configured to perform the processing of information during the transactions performed by the point-of-sale system.

Figure 15:
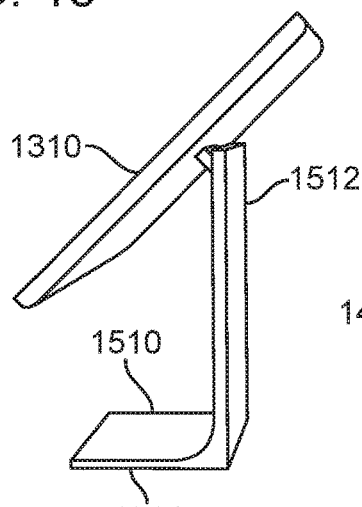
FIG. 15 illustrates the example point-of-sale system of FIG. 13 as viewed from a side perspective view and showing the second terminal completely independent from the first terminal, in a separated position in accordance with an embodiment.
Figure 15:
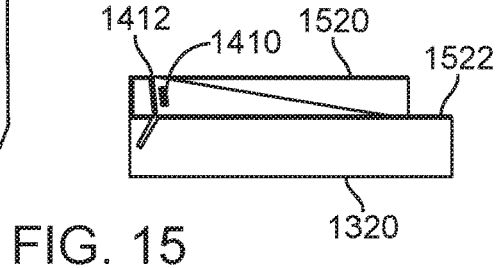

FIG. 15 illustrates the example point-of-sale system of FIG. 13 as viewed from a side perspective view and showing the second terminal 1320 physically independent of the first terminal 1310 and arranged in a separated position. The first terminal 1310 includes a base 1314 having a substantially flat portion 1510 for contacting a surface that supports the terminal 1310 and an upright portion 1512 that supports the computing device portion of the terminal 1310. The second terminal 1320 has sidewalls 1520 and 1522 that provide privacy for the display of the computing device 1420 when being used by a consumer.

Figure 16:
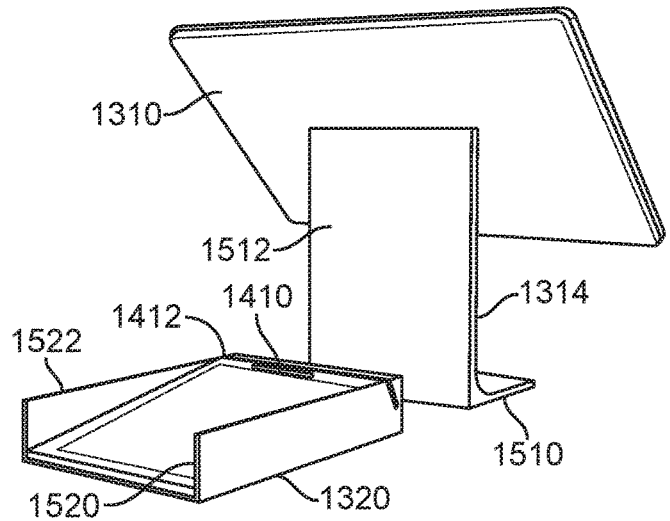
FIG. 16 illustrates the example point-of-sale system of FIG. 13 as viewed from the back perspective view and showing the second terminal completely independent from the first terminal, in accordance with an embodiment.

FIG. 16 illustrates the example point-of-sale system of FIG. 13 as viewed from the back perspective view and showing the second terminal completely separated from the first terminal. The tapered surface of the second terminal 1320 and the sides 1520, 1522 provide for privacy for use of the stand by consumers as appropriate.

Figure 17:
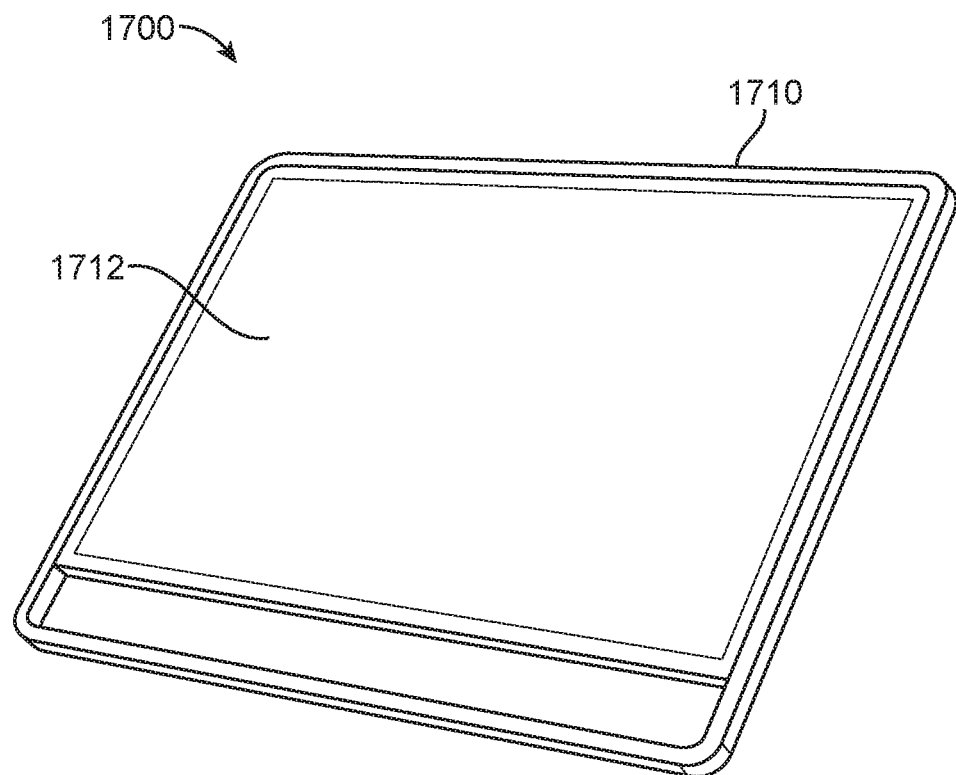
FIG. 17 illustrates another example point-of-sale system as viewed from a front perspective view showing a first terminal and including a second terminal not visible in FIG. 17 that is detachably mated to the first terminal, in accordance with an embodiment.

FIG. 17 illustrates another example point-of-sale system as viewed from a front perspective view showing a first terminal and including a second terminal not visible in FIG. 17 that is detachably mated to the first terminal, in accordance with an embodiment. The point-of-sale system includes a first terminal 1710. The first terminal 1710 is configured, for example, to be a merchant terminal in a merchant-facing direction. As shown, the merchant-facing direction shows only the display of the terminal 1710, and the second terminal is not visible in this view. The first terminal 1710 includes a first computing device 1712 and has a base (1810 in FIG. 18) into which a second terminal (1820 of FIG. 18) is detachably received. The first computing device 1712 can be integrally provided with the first terminal or another computing device that is separately provided and inserted into the terminal.

Figure 18:
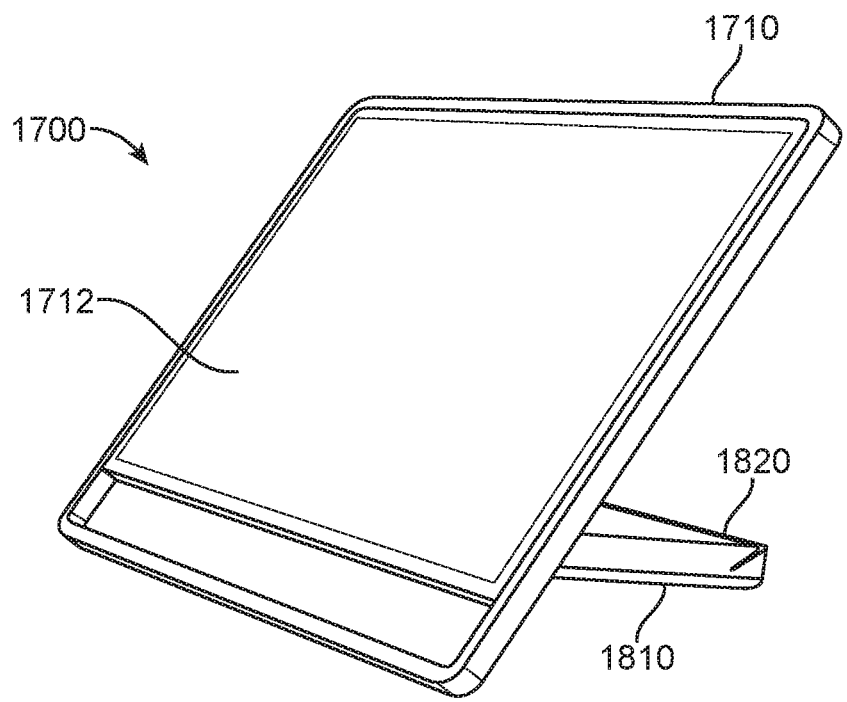
FIG. 18 illustrates the example point-of-sale system of FIG. 17 as viewed from a side perspective view showing the first terminal with the second terminal detachably mated thereto, in accordance with an embodiment.

FIG. 18 illustrates the example point-of-sale system of FIG. 17 as viewed from a side perspective view showing the first terminal with the second terminal detachably mated thereto, in accordance with an embodiment. The second terminal can, for example, be configured in a consumer-oriented direction. The first terminal 1710 has a base 1810 onto which the second terminal 1820 is detachably mated.

Figure 19:
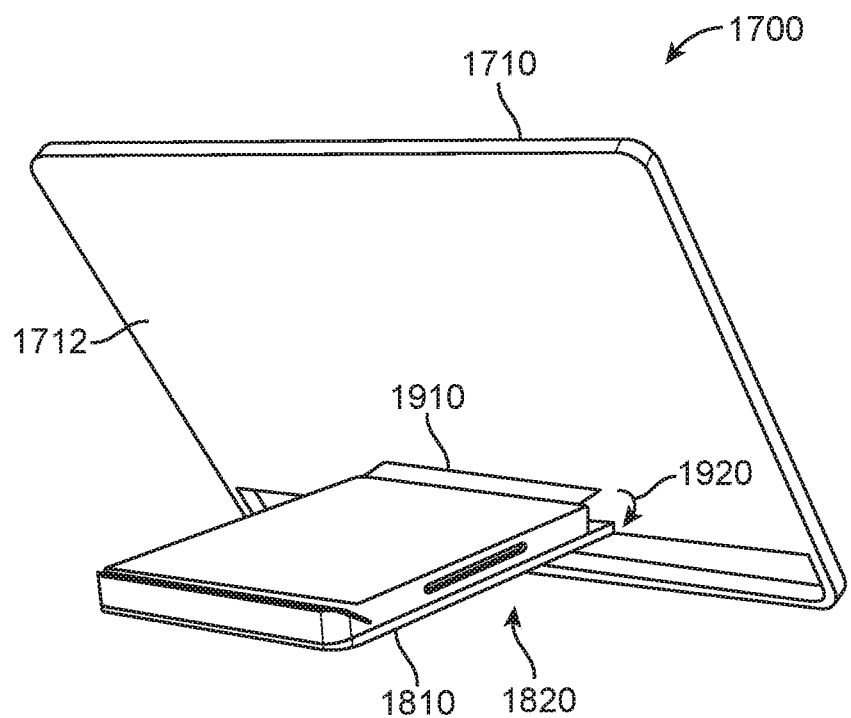
FIG. 19 illustrates the example point-of-sale system of FIG. 17 as viewed from a rear perspective view with the second terminal detachably mated to the first terminal, in accordance with an embodiment.

FIG. 19 illustrates the example point-of-sale system of FIG. 17 as viewed from a rear perspective view with the second terminal detachably mated to the first terminal, in accordance with an embodiment. The second terminal 1820 includes a leg portion 1910 that, when the second terminal 1820 is separated from the first terminal 1710, can be rotated (in the direction of arrow 1920, for example), so that the second terminal can be independent of the first terminal, as shown, for example, in FIG. 20. The screen of the second terminal 1820 has a low angle to provide improved privacy for consumers. A minimalist system is also provided so that the consumer views only the single slab of the consumer terminal 1820 when viewed from the consumer-facing direction.

Figure 20:
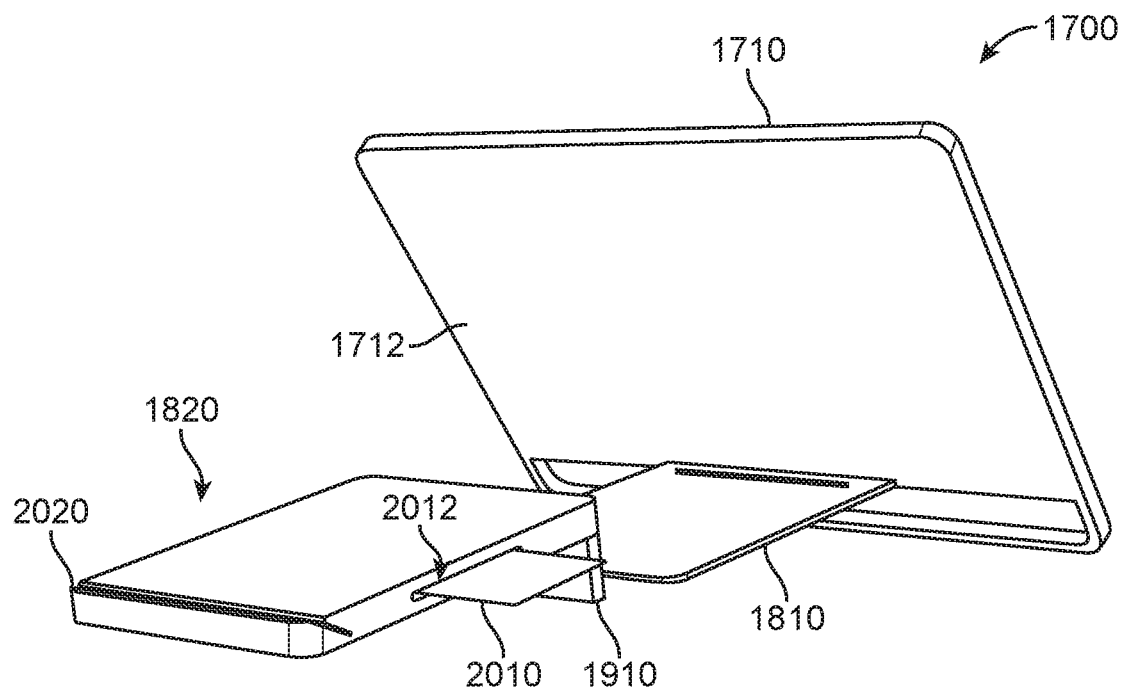
FIG. 20 illustrates the example point-of-sale system of FIG. 17 as viewed from a rear perspective view, with the second terminal separated from the first terminal in a separated position, in accordance with an embodiment.

FIG. 20 illustrates the example point-of-sale system of FIG. 17 as viewed from a rear perspective view, with the second terminal separated from the first terminal in a separated position, in accordance with an embodiment. The second terminal 1820 is completely independent of the first terminal 1810 and supported by the leg portion 1910. The base 1810 is more clearly visible in this view, the base 1810 providing support for the first terminal 1710 as well as a place for the second terminal to be mated to when in the fixed position as shown in FIGS. 17-19. As shown in FIG. 20, a payment card 2010 is inserted into a payment card reader 2012, which is a chip-type card reader in this embodiment. A swipe slot card reader 2020 is also provided on the second terminal 1820. In this embodiment, the payment card 2010 is a chip-type card that is inserted into the dip slot card reader 2012.

Figure 21:
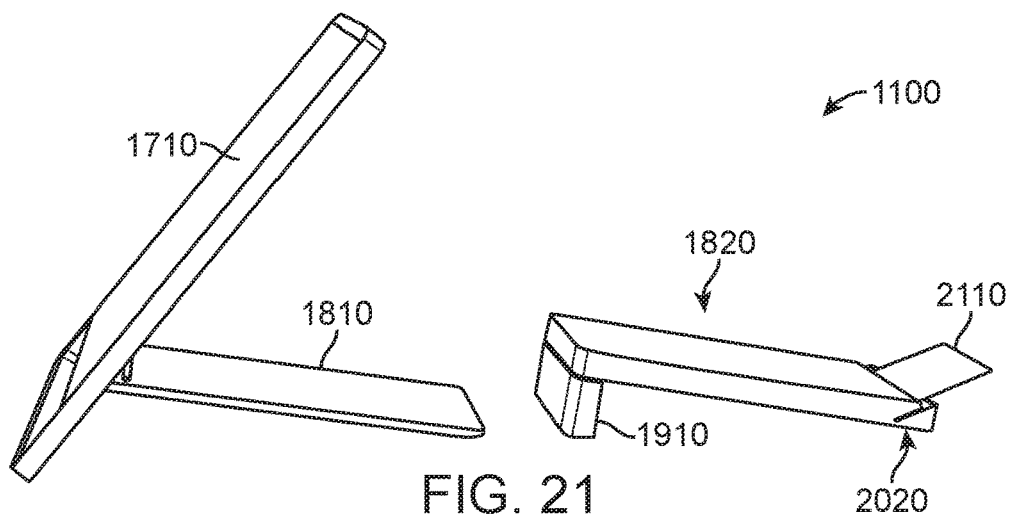
FIG. 21 illustrates the example point-of-sale system of FIG. 17 as viewed from a side perspective view with the second terminal and the first terminal in the separated position, in accordance with an embodiment.

FIG. 21 illustrates the example point-of-sale system of FIG. 17 as viewed from a side perspective view with the second terminal and the first terminal in the separated position, in accordance with an embodiment. In this example embodiment, a swipe-type payment card 2110 is shown inserted in the swipe slot card reader 2020.

Figure 22:
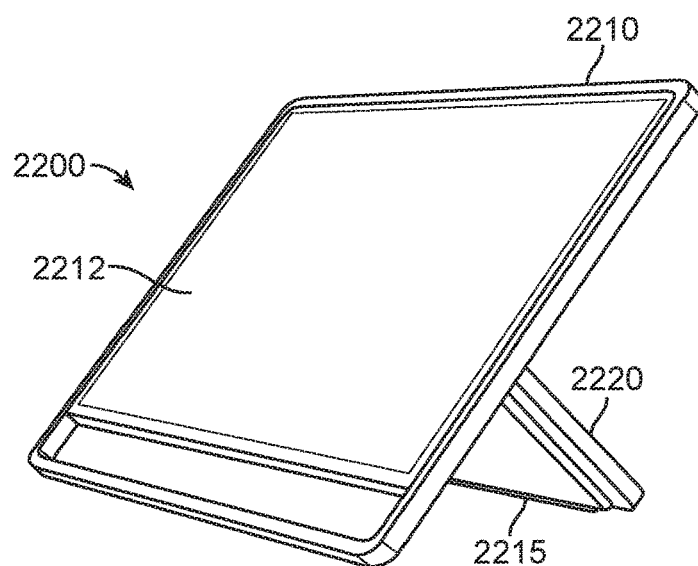
FIG. 22 illustrates another example point-of-sale system as viewed from a front perspective view with a first terminal detachably mated to a second terminal, and shown in a fixed position, in accordance with an embodiment.

FIG. 22 illustrates another example point-of-sale system as viewed from a front perspective view with a first terminal detachably mated to a second terminal, and shown in a fixed position, in accordance with an embodiment. In the point-of-sale system 2200, a first terminal 2210 includes a first computing device 2212, which can be an integrally-provided computing device or a separate component inserted into the terminal 2210. The first terminal 2210 is configured to be a merchant-facing terminal having a base 2215 that supports a second terminal 2220 configured to be a consumer-facing terminal.

Figure 23:
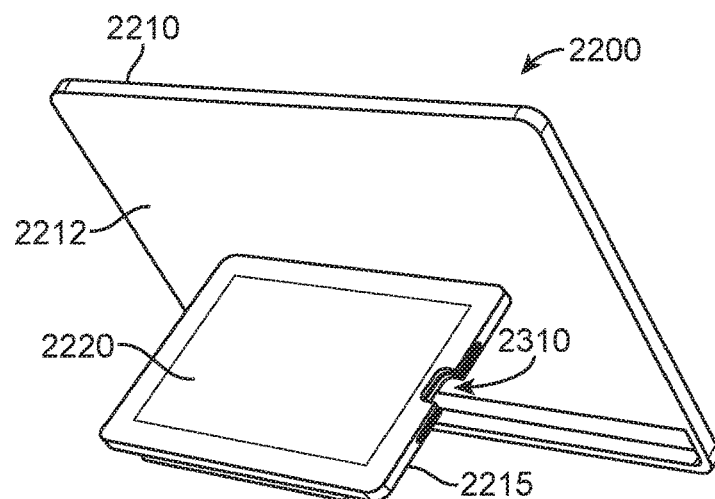
FIG. 23 illustrates the example point-of-sale system of FIG. 22 as viewed from a rear perspective view, in accordance with an embodiment.

FIG. 23 illustrates the example point-of-sale system of FIG. 22 as viewed from a rear perspective view, in accordance with an embodiment. The second terminal 2220 is detachably mated to the first terminal 2210 and received on the base 2215 of the first terminal 2210. The second terminal 2220 includes a hybrid card reader 2310 configured to read both magnetic stripe-type cards and chip-type cards.

Figure 24:
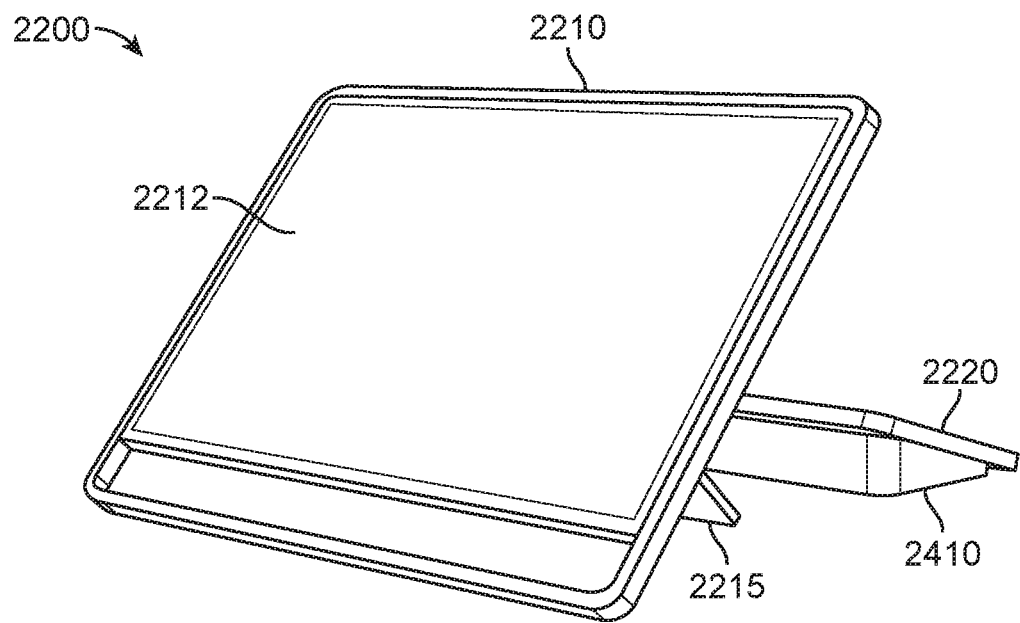
FIG. 24 illustrates the example point-of-sale system of FIG. 22 as viewed from a front perspective view with the first terminal separated from and completely independent of the first terminal, shown in a separated position, in accordance with an embodiment.

FIG. 24 illustrates the example point-of-sale system of FIG. 22 as viewed from a front perspective view with the first terminal separated from and completely independent of the first terminal, shown in a separated position, in accordance with an embodiment. The second terminal 2220 has been separated from the base 2215 of the first terminal 2210 and is now shown supported on its own base 2410.

Figure 25:
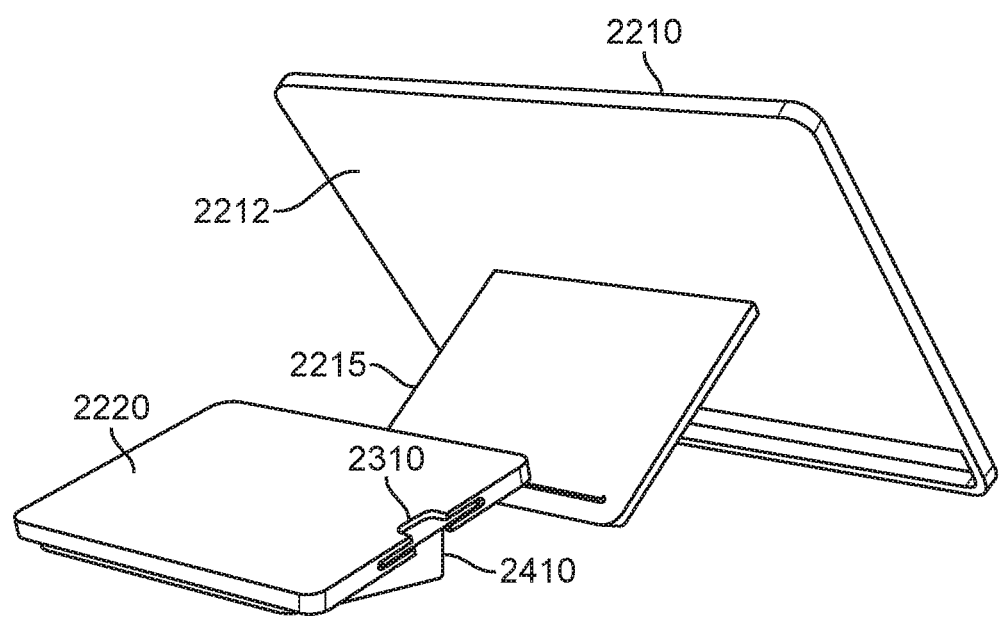
FIG. 25 illustrates the example point-of-sale system of FIG. 22 as viewed from a rear perspective view with the first terminal and the second terminal shown in the separated position, in accordance with an embodiment.

FIG. 25 illustrates the example point-of-sale system of FIG. 22 as viewed from a rear perspective view with the first terminal and the second terminal shown in the separated position, in accordance with an embodiment. The second terminal 2220 includes the card reader 2310 and is supported by base 2410.

Figure 26:
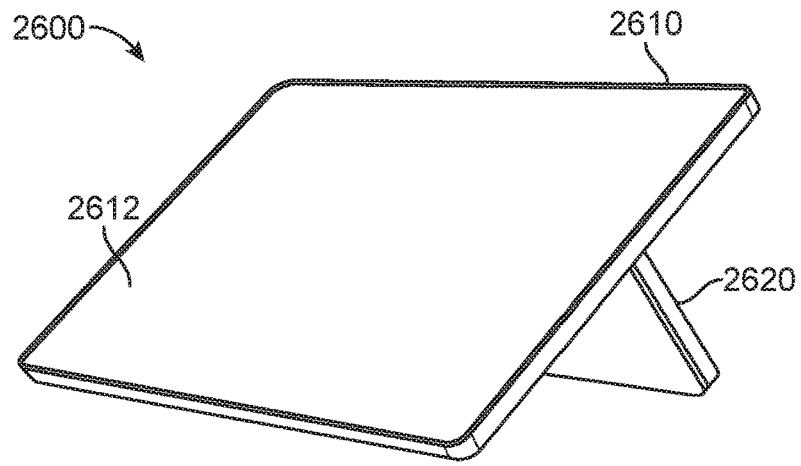
FIG. 26 illustrates another example point of sale system as viewed from a front perspective view with a first terminal detachably mated to a second terminal, and shown in a fixed position, in accordance with an embodiment.

FIG. 26 illustrates another example point of sale system as viewed from a front perspective view with a first terminal detachably mated to a second terminal, and shown in a fixed position, in accordance with an embodiment. The point-of-sale system 2600 includes a first terminal 2610 that can be configured, for example, to be a merchant-facing terminal, that is detachably mated to a second terminal 2620 that can be configured, for example, to be a consumer-facing terminal. The first terminal 2610 includes a first computing device 2612 that, for example, can be a tablet computer, a mobile phone, or a device integrally provided with the first terminal.

Figure 27:
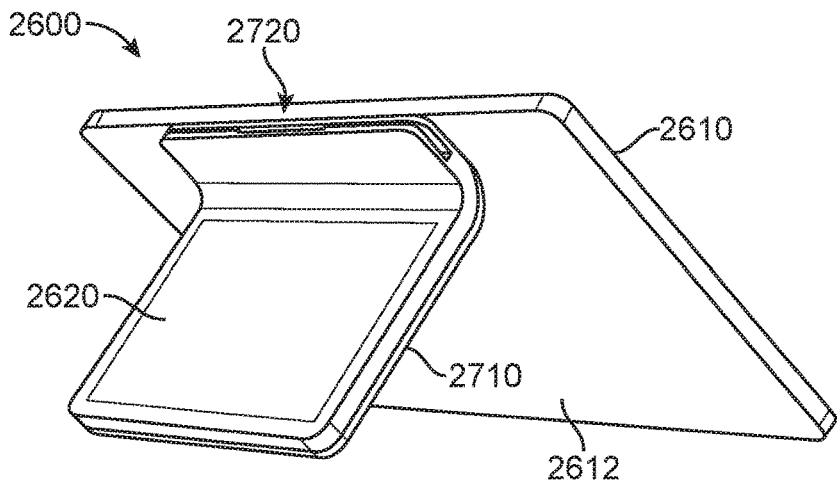
FIG. 27 illustrates the example point-of-sale system of FIG. 26 as viewed from a rear perspective view, in accordance with an embodiment.
Figure 28:
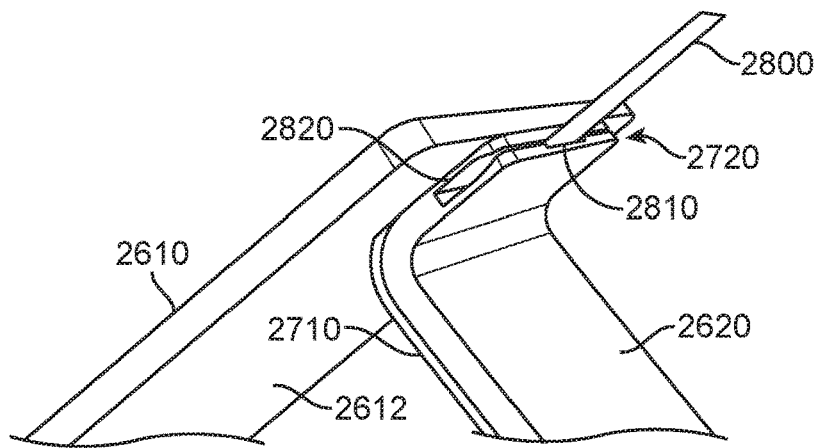
FIG. 28 illustrates the example point-of-sale system of FIG. 26 as viewed in partial cut-out detailing the card reader and showing a payment card inserted in the card reader, in accordance with an embodiment.
Figure 29:
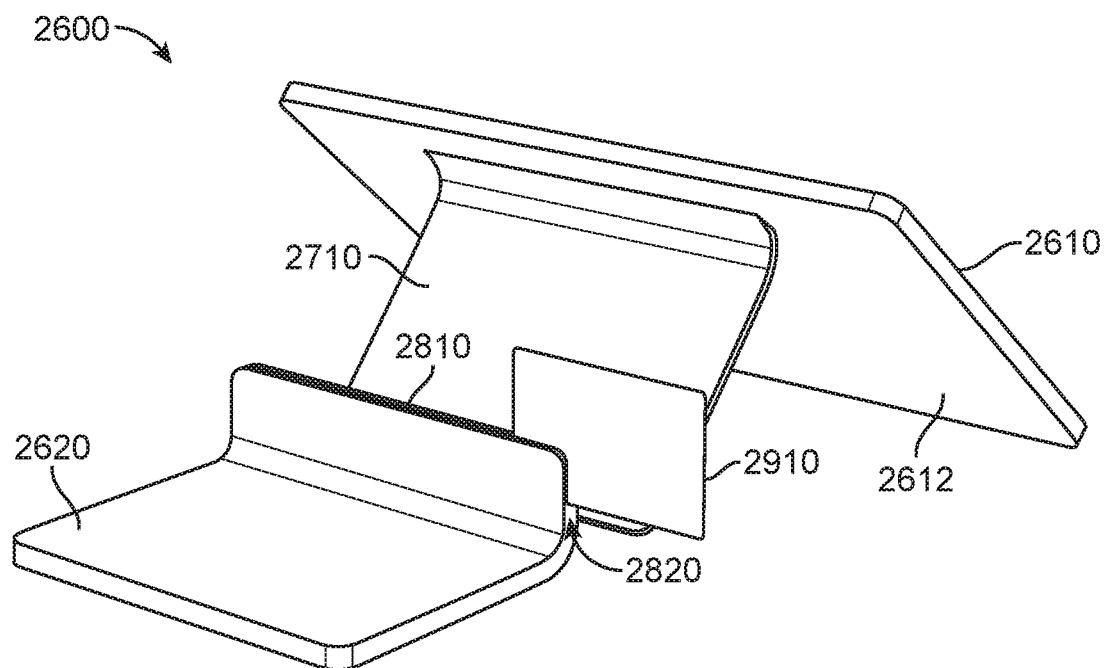
FIG. 29 illustrates the example point-of-sale system of FIG. 26 as viewed from a rear perspective view with the first terminal separated from and completely independent of the first terminal, shown in a separated position, in accordance with an embodiment.

FIG. 27 illustrates the example point-of-sale system of FIG. 26 as viewed from a rear perspective view, in accordance with an embodiment. The first terminal 2610 includes a base 2710 that support the first terminal 2610 and also detachably receives the second terminal 2620. With reference to FIG. 28, the hybrid card reader 2720 is shown in greater detail. The hybrid card reader 2720 includes a dip slot opening 2810 configured to receive a chip-type card, and a swipe slot 2820 configured to read magnetic stripe-type cards. As shown in FIG. 28, the card reader 2810 has a payment card 2800 received therein. Note that the card readers are accessible by both the consumers and the merchants in this embodiment when in the fixed position, and thereby a payment card can be inserted and processed by either the merchant or the consumer or both. FIG. 29 shows a swipe-type card inserted into the card reader 2820 and FIG. 30 shows a chip-type card inserted into the card reader 2810.

FIG. 29 illustrates the example point-of-sale system of FIG. 26 as viewed from a rear perspective view with the first terminal separated from and completely independent of the first terminal, shown in a separated position, in accordance with an embodiment. The second terminal 2620 has a swipe-type payment card 2910 inserted into the swipe card reader 2820.

Figure 30:
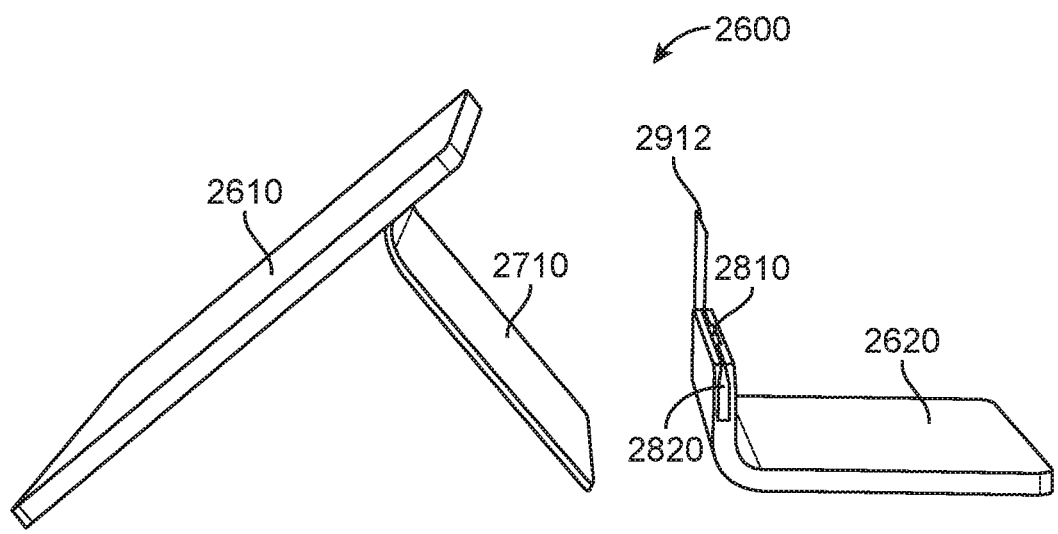
FIG. 30 illustrates the example point-of-sale system of FIG. 26 as viewed from a side perspective view with the first terminal and the second terminal shown in the separated position, in accordance with an embodiment.

FIG. 30 illustrates the example point-of-sale system of FIG. 26 as viewed from a side perspective view with the first terminal and the second terminal shown in the separated position, in accordance with an embodiment. The second terminal 2620 has a chip-type payment card 2912 inserted in the dip slot card reader 2810.

Having now described various example embodiments of the point-of-sale system using in a point-of-sale transaction, some example environments for conducting a financial transaction at a point-of-sale system will now be described. Other environments and applications of the point-of-sale system should be apparent to those ordinarily skilled in the art.

Figure 31:
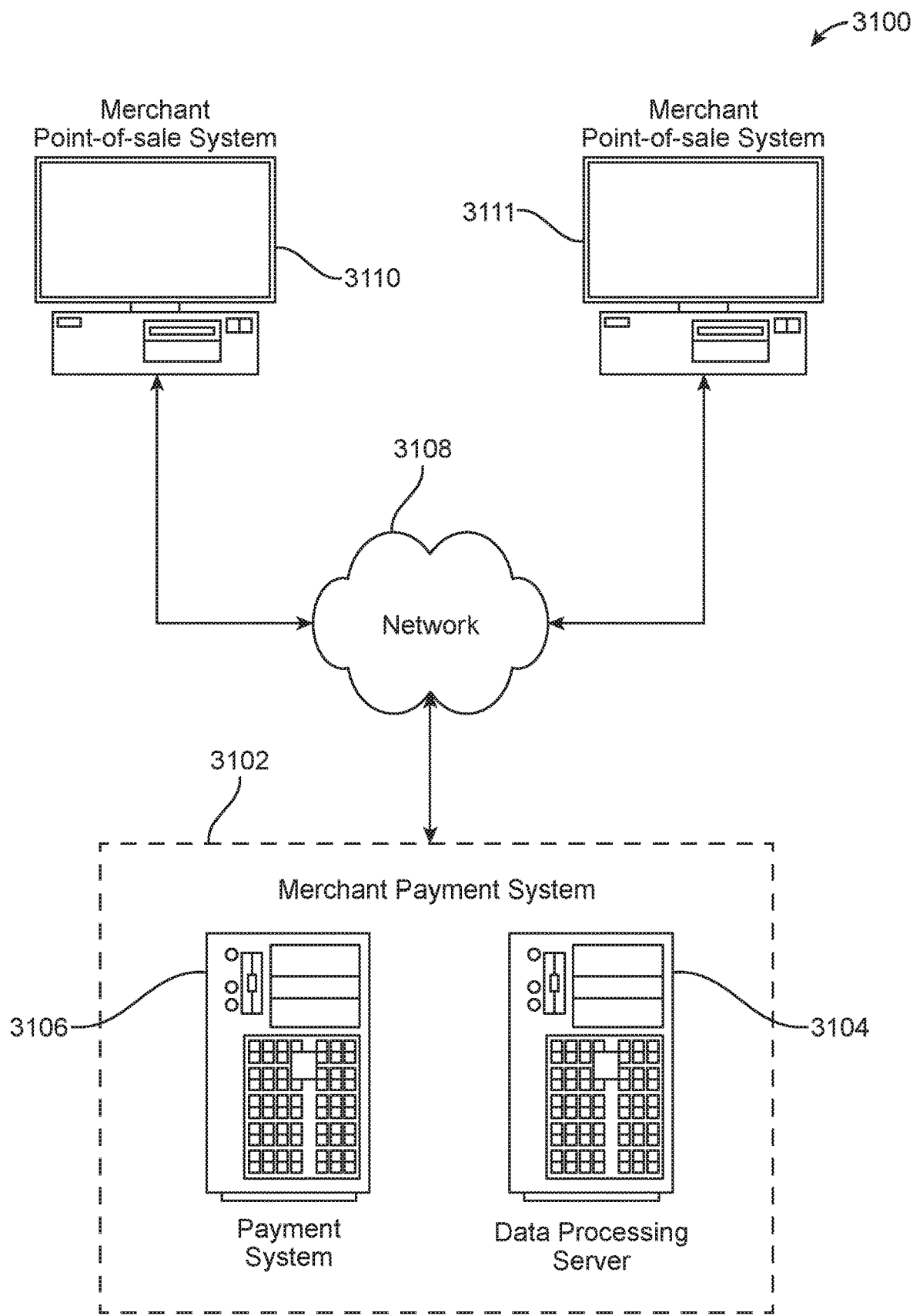
FIG. 31 illustrates an example environment for conducting a financial payment transaction in accordance with an alternate embodiment.

FIG. 31 illustrates an example environment for conducting a financial transaction at a point-of-sale system in accordance with various embodiments. In this example, the exemplary environment 3100 includes a merchant payment system 3102 for processing transactions between a customer and a merchant. The merchant payment system includes, for example, a data processing server 3104 and a payment server 3106. The data processing server can be implemented as computer programs on one or more computers in one or more locations, in which the systems, components, and techniques described herein can be implemented. The operation of the payment server is described below in reference to FIG. 32. The example environment also includes computing devices, e.g., transaction registers or other point-of-sale systems, corresponding to the merchant 3110 and 3111.

As described, the point-of-sale systems 3110 and 3111 can include the computing device, where the computing device can be coupled to or in communication with the merchant payment system through a data communication network 3108, e.g., the Internet. These devices each generally include a memory, e.g., a random access memory (RAM), for storing instructions and data, and a processor for executing stored instructions. The devices and can each include one or more components, e.g., software or hardware, that are operable to send and receive requests, messages, or other types of information over the network. Some examples of computing devices include personal computers, cellular phones, handheld messaging devices, laptop computers, personal data assistants, tablet devices, and the like.

The network 3108 can include any appropriate network, including an intranet, the Internet, a cellular network, a local area network, a wide area network, or any other such network, or combination thereof. Components used for such a system can depend at least in part upon the type of network, the environment selected, or both. Protocols and components for communicating over such a network are well known and will not be discussed herein in detail. The devices and the referral system can communicate over the network using wired or wireless connections, and combinations thereof.

Each of the computing devices is configured to send to the merchant payment system respective financial data that corresponds to a financial transaction that was processed by the computing device. The financial data can include, for example, data stored in a financial payment card, e.g., Track 1 data, receipt email addresses, and information describing a card-less payment account. Other examples of financial data that can be captured includes purchase data, e.g., an itemized listing of purchases, card mix data, geolocation data indicating a geographic location of a particular transaction, online/offline card data, data describing the merchant, e.g., merchant category codes (MCCs), and any type of data that is received upon a customer's authentication into a social network.

Figure 32:
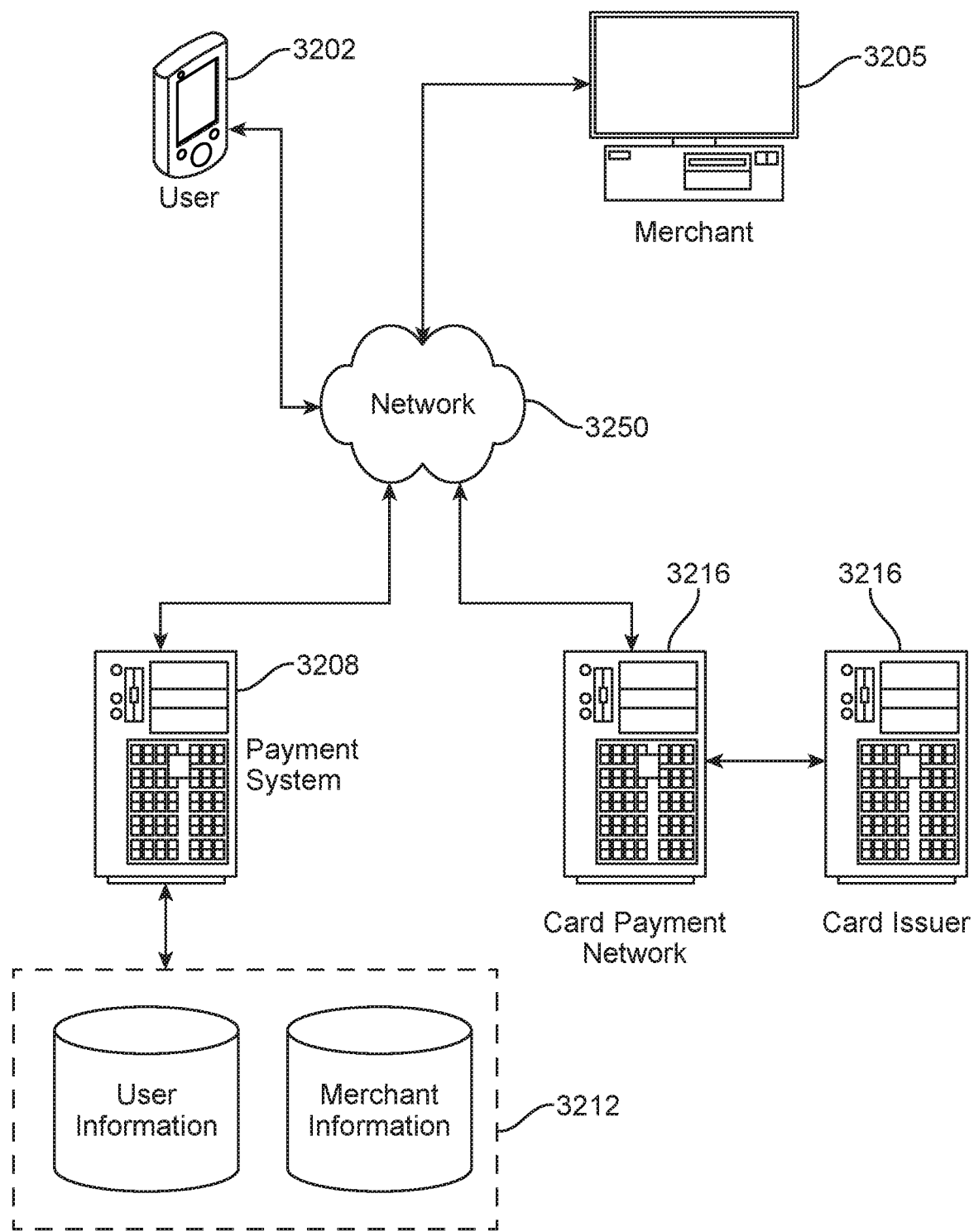
FIG. 32 illustrates an example environment for implementing a merchant payment system.

FIG. 32 illustrates an example of an environment 3200 for implementing a payment service network. Although a mobile device environment is described for purposes of explanation, different environments may be used, e.g., a web-based environment, to implement various embodiments. The example environment includes a payment system 3208, which can be implemented as computer programs on one or more computers in one or more locations, in which the systems, components, and techniques described below can be implemented. The example environment also includes a user device 3202 and a merchant device 3205.

The user device and the merchant device can each be a computer coupled to the payment system through a data communication network 3250, e.g., the Internet. The user device and the merchant device each generally include a memory, e.g., a random access memory (RAM), for storing instructions and data, and a processor for executing stored instructions. The user device and the merchant device can each include one or more components, e.g., software or hardware, that are configured to respectively determine a geographic location of the user device or the merchant device, using, for example, various geolocation techniques, e.g., a global positioning system (GPS). Further, the user device and the merchant device can each be any appropriate device operable to send and receive requests, messages, or other types of information over the network. Some examples of user devices include personal computers, cellular phones, handheld messaging devices, laptop computers, personal data assistants, tablet devices, and the like.

The network can include any appropriate network, including an intranet, the Internet, a cellular network, a local area network, a wide area network, or any other such network, or combination thereof. Components used for such a system can depend at least in part upon the type of network, the environment selected, or both. Protocols and components for communicating over such a network are well known and will not be discussed herein in detail. The payment system, the merchant device, and the user device can communicate over the network using wired or wireless connections, and combinations thereof.

As used in this specification, a financial transaction is a transaction that is conducted between a customer and a merchant at a point-of-sale. When paying for a financial transaction, the customer can provide the merchant with cash, a check, or credit card for the amount that is due. The merchant can interact with a point-of-sale device, e.g., merchant device, to process the financial transaction. During financial transactions, the point-of-sale device can collect data describing the financial transaction, including, for example, the amount of payment received from customers.

In some implementations, the payment system is configured to accept card-less payment transactions from customers, e.g., the customer. As used in this specification, a card-less payment transaction is a transaction conducted between the customer and a merchant at the point-of-sale during which a financial account of the customer is charged without the customer having to physically present a financial payment card to the merchant at the point-of-sale. That is, the merchant need not receive any details about the financial account, e.g., the credit card issuer or credit card number, for the transaction to be processed.

In some embodiments, before conducting card-less payment transactions, the customer typically creates a user account with the payment system. The customer can create the user account, for example, by interacting with a user application that is configured to perform card-less payment transactions and that is running on the user device. When creating a user account with the payment system, the customer will provide information of the customer, data describing a financial account of the customer, e.g., credit card number, expiration date, and a billing address. This user information can be securely stored by the payment system, for example, in a user information database. To accept card-less payment transactions, the merchant typically creates a merchant account with the payment system by providing information describing the merchant including, for example, a merchant name, contact information, e.g., telephone numbers, the merchant's geographic location address, and one or more financial accounts to which funds collected from users will be deposited. This merchant information can be securely stored by the payment system, for example, in a merchant information database.

The payment system can be configured to perform card-less payment transactions. The payment system can include one or more servers that are configured to securely perform electronic financial transactions, e.g., electronic payment transactions, between a customer and a merchant, for example, through data communicated between the user device and the merchant device. Generally, when a customer and a merchant enter into an electronic financial transaction, the transaction is processed by transferring funds from a financial account associated with the user account to a financial account associated with the merchant account.

The payment system is configured to send and receive data to and from the user device and the merchant device. For example, the payment system can be configured to send data describing merchants to the user device using, for example, the information stored in the merchant information database 3212. For example, the payment system can communicate data describing merchants that are within a threshold geographic distance from a geographic location of the user device, as described in this specification. The data describing merchants can include, for example, a merchant name, geographic location, contact information, and an electronic catalogue, e.g., a menu, that describes items that are available for purchase from the merchant.

In some embodiments, the payment system is configured to determine whether a geographic location of the user device is within a threshold geographic distance from a geographic location of the merchant device. The payment system can determine a geographic location of the user device using, for example, geolocation data provided by the user device. Similarly, the payment system can determine a geographic location of the merchant device using, for example, geolocation data provided by the merchant device or using a geographic address, e.g., street address, provided by the merchant. Depending on the implementation, the threshold geographic distance can be specified by the payment system or by the merchant.

Determining whether the user device is within a threshold geographic distance of the merchant device can be accomplished in different ways including, for example, determining whether the user device is within a threshold geographic radius of the merchant device, determining whether the user device is within a particular geofence, or determining whether the user device can communicate with the merchant device using a specified wireless technology, e.g., Bluetooth or Bluetooth low energy (BLE). In some embodiments, the payment system restricts card-less payment transactions between the customer and the merchant to situations where the geographic location of the user device is within a threshold geographic distance from a geographic location of the merchant device.

The payment system can also be configured to communicate with a computer system 3216 of a card payment network, e.g., Visa or MasterCard, over the network, or over a different network, for example, to conduct electronic financial transactions. The computer system of the card payment network can communicate with a computer system 3216 of a card issuer, e.g., a bank. There may be computer systems of other entities, e.g., the card acquirer, between the payment system and the computer system of the card issuer.

The customer operating the user device that is within a threshold geographic distance of the merchant can interact with a user application running on the user device to conduct a card-less payment transaction with the merchant. While interacting with the user application, the customer can select the merchant, from a listing of merchants, with whom the customer wants to enter into a card-less payment transaction. The user can select the merchant, for example, by selecting a "check in" option associated with the merchant. The user device can communicate data to the payment system indicating that the customer has checked in with the merchant. In response, the payment system can communicate data to notify the merchant device that the user has checked in. A merchant application running on the merchant device can notify the merchant that the user has electronically checked in with the merchant through a display screen of the merchant device.

Once checked in, the customer can collect, or request, items that are available for purchase from the merchant. When the customer is ready to enter into the card-less payment transaction, the customer can, for example, approach a point-of-sale for the merchant and identify him or herself. For example, the customer can verbally notify the merchant that the customer wants to enter into a card-less payment transaction and can provide the merchant with the customer's name. The merchant can then interact with the merchant application to select the customer, from a listing of customers that have checked in with the merchant, to initiate a card-less payment transaction for the items being purchased by the customer. For example, the merchant can determine a total amount to bill the customer for the items being purchased. The customer can verbally approve the total amount to be billed and, in response, the merchant can submit a request for a card-less payment transaction for the total amount to the payment system. In response, the payment system can obtain, for example, from the user information database, data describing a financial account associated with a user account of the customer to which the total amount will be billed.

The payment system can then communicate with the computer system of a card payment network to complete an electronic financial transaction for the total amount to be billed to the customer's financial account. Once the electronic financial transaction is complete, the payment system can communicate data describing the card-less payment transaction to the user device, e.g., an electronic receipt, which can, for example, notify the customer of the total amount billed to the user for the card-less payment transaction with the particular merchant.

For clarity of explanation, in some instances the present technology may be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

What is claimed is:

1. A payment terminal, comprising:
   a secure processor;
   a first display connected to the secure processor;
   a first user input device associated with the first display and connected to the secure processor;
   a payment instrument reader connected to the secure processor;
   a main processor separate from the secure processor, the main processor connected to the secure processor; and
   a housing enclosing the secure processor and the main processor.

2. The payment terminal of claim 1, further comprising a second display connected to the main processor and a second user input device connected to the main processor, wherein the first display, second display, first user input device, second user input device, and payment instrument reader are statically mounted to the housing.

3. The payment terminal of claim 2, wherein the second display and second user input device are isolated from the secure processor.

4. The payment terminal of claim 2, wherein the first and second user input devices each comprise a touchscreen overlaid over the first and second displays, respectively.

5. The payment terminal of claim 2, wherein the first display is statically coupled to the second display by a junction formed by the housing, and the payment instrument reader is arranged along the junction.

6. The payment terminal of claim 2, wherein the first display is statically coupled to the second display by a junction formed by the housing and the payment instrument reader comprises a magnetic stripe reader defining a sliding axis, wherein the sliding axis is parallel to the junction.

7. The payment terminal of claim 2, wherein the payment instrument reader comprises a card reader integrated into the first display.

8. The payment terminal of claim 2, wherein the payment instrument reader comprises a card reader integrated into the second display.

9. The payment terminal of claim 2, wherein the payment instrument reader comprises a hybrid card reader that is configured to receive magnetic stripe-type cards and chip-type cards.

10. The payment terminal of claim 2, wherein the payment instrument reader comprises a first dip slot card reader on the second display that is configured to read chip-type cards, and a second swipe slot card reader on the second display that is configured to read magnetic swipe-type cards.

11. The payment terminal of claim 1, wherein the main processor is physically separate from the secure processor.

12. The payment terminal of claim 11, wherein the secure processor is located in a secure enclave.

13. The payment terminal of claim 12, further comprising a wired connection connecting the main processor to the secure processor.

14. The payment terminal of claim 1, further comprising a wireless communication module connected to the main processor and a battery connected to the secure processor and main processor, wherein the wireless communication module and the battery are enclosed within the housing.

15. The payment terminal of claim 1, wherein the main processor receives transaction information from the secure processor, transmits the transaction information to a remote computing system, receives operating instructions from the remote computing system, and operates based on the operating instructions.

16. The payment terminal of claim 15, further comprising a multiplexer, wherein the multiplexer forwards the user input signals to the main processor in the unsecured mode.

17. A point of sale system, comprising:
a secure processor;
a payment instrument reader connected to the secure processor;
a main processor separate from the secure processor, the main processor connected to the secure processor;
a first display connected to the main processor and isolated from the secure processor;
a first user input device connected to the main processor and isolated from the secure processor; and
a housing enclosing the secure processor and the main processor.

18. The point of sale system of claim 17, further comprising a secure enclave, wherein the main processor is located outside of the secure enclave and the secure processor is located within the secure enclave.

19. The point of sale system of claim 18, further comprising a second display connected to the secure processor and a second user input device connected to the secure processor.

20. The point of sale system of claim 19, wherein the main processor is connected to the first display and the first user input device by a first set of dedicated connections; and wherein the secure processor is connected to the payment instrument reader, the second user input device, and the second user display by a second set of dedicated physical connections separate from the first set of dedicated physical connections.

21. The point of sale system of claim 19, wherein the first display is statically coupled to the second display by a junction formed by the housing, wherein the first and second user input devices each comprise touchscreens overlaid over the first and second displays, respectively and the payment instrument reader is arranged long the junction.

22. The point of sale system of claim 19, wherein a stripe-card-specific GUI is sent to the second display when a magnetic-stripe-type card is used in payment during a point of sale transaction.

23. The point of sale system of claim 19, wherein a chip-type-card-specific GUI is sent to the second display when a chip-type card is used in payment during a point of sale transaction.

24. The point of sale system of claim 19, wherein the second user input device comprises a hybrid card reader configured to receive a payment card used during a point-of-sale transaction, the payment card being a magnetic stripe-type card or an IC chip-type card, the hybrid card reader being coupled to the second display to perform a payment transaction during the point of sale transaction between a merchant and a consumer.

25. The point of sale system of claim 17, further comprising an anti-tamper device coupled to the secure processor.

\* \* \* \* \*